US009226119B2

(12) United States Patent
Suryavanshi et al.

(10) Patent No.: US 9,226,119 B2
(45) Date of Patent: Dec. 29, 2015

(54) USING SENSOR DATA TO PROVIDE INFORMATION FOR PROXIMALLY-RELEVANT GROUP COMMUNICATIONS

(71) Applicant: QUALCOMM Incorporated, San Diego, CA (US)

(72) Inventors: Vijay Anandrao Suryavanshi, San Diego, CA (US); Mark Maggenti, Del Mar, CA (US); Sandeep Sharma, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/085,274

(22) Filed: Nov. 20, 2013

(65) Prior Publication Data
US 2015/0141005 A1 May 21, 2015

(51) Int. Cl.
*H04W 4/00* (2009.01)
*H04W 4/08* (2009.01)
*H04W 48/16* (2009.01)
*H04L 29/08* (2006.01)
*H04W 12/10* (2009.01)
(Continued)

(52) U.S. Cl.
CPC .............. *H04W 4/08* (2013.01); *H04L 67/125* (2013.01); *H04W 12/10* (2013.01); *H04W 48/16* (2013.01); *G01S 5/0284* (2013.01); *H04W 4/027* (2013.01); *H04W 64/006* (2013.01)

(58) Field of Classification Search
CPC ....... H04W 4/08; H04W 48/16; H04W 88/06; H04W 48/18; H04W 4/008
See application file for complete search history.

(56) References Cited

U.S. PATENT DOCUMENTS 6,839,417 B2   1/2005   Weisman et al.
8,019,383 B2   9/2011   Kossi et al.
(Continued)

FOREIGN PATENT DOCUMENTS

EP      2317729 A1    5/2011

OTHER PUBLICATIONS

International Search Report and Written Opinion—PCT/US2014/065535—ISA/EPO—Feb. 17, 2015.
(Continued)

*Primary Examiner* — Khalid Shaheed
(74) *Attorney, Agent, or Firm* — The Marbury Law Group, PLLC

(57) ABSTRACT

Methods, devices, and systems for a mobile device to perform actions associated with applications when confirmed to be within proximity of a physical location relevant to the applications, including identifying a unique identifier of a proximate wireless network access point, determining whether the unique identifier matches a predefined identifier stored on the mobile device and associated with an application, obtaining sensor data via a sensor in response to determining that the unique identifier matches the predefined identifier, processing the obtained sensor data to identify encoded information, determining whether the encoded information within the obtained sensor data is associated with the unique identifier, and performing an action based on the encoded information in response to determining that the encoded information is associated with the unique identifier. In various embodiments, the unique identifier may be a service set identifier (SSID), and the sensor data may be acoustic signals emitted from a speaker.

30 Claims, 13 Drawing Sheets

(51) Int. Cl.
*H04W 4/02* (2009.01)
*H04W 64/00* (2009.01)
*G01S 5/02* (2010.01)

(56) References Cited

U.S. PATENT DOCUMENTS

| | | | |
|---|---|---|---|
| 8,325,731 B2 | 12/2012 | Fang et al. | |
| 2006/0075506 A1* | 4/2006 | Sanda et al. | 726/26 |
| 2007/0287474 A1 | 12/2007 | Jenkins et al. | |
| 2008/0109317 A1* | 5/2008 | Singh | 705/14 |
| 2008/0160977 A1 | 7/2008 | Ahmaniemi et al. | |
| 2010/0332668 A1 | 12/2010 | Shah et al. | |
| 2011/0179182 A1 | 7/2011 | Vadla Ravnas et al. | |
| 2012/0214416 A1* | 8/2012 | Kent et al. | 455/41.2 |
| 2013/0045758 A1* | 2/2013 | Khorashadi et al. | 455/456.3 |
| 2013/0198817 A1* | 8/2013 | Haddad et al. | 726/5 |
| 2014/0142846 A1* | 5/2014 | Chun et al. | 701/519 |
| 2015/0031381 A1* | 1/2015 | Kotecha et al. | 455/452.1 |

OTHER PUBLICATIONS

Francisco B.J et al., "NFC solution for the development of Smart Scenarios Supporting Tourism Applications and Surfing in Urban Environments," Jun. 1, 2010, Trends in Applied Intelligent Systems, Springer Berlin Heidelberg, pp. 229-238.

* cited by examiner

USING SENSOR DATA TO PROVIDE INFORMATION FOR PROXIMALLY-RELEVANT GROUP COMMUNICATIONS

BACKGROUND

Mobile devices are often utilized to participate in group communications, such as push-to-talk (PTT) sessions with a defined group of devices. In many group communication (or group calling) systems, the operator of the group communication system creates the groups and provides the group communication information to the users. In current systems, groups are maintained and provisioned by the network operator, and group IDs are provided to the group members to enable their mobile devises to access the group. Using the received group ID, a user's mobile device can access a group communications server (or group management server), and upon authentication with a predefined participant list, be granted access to the established group. Current systems involve the network operator provisioning the network backend components, such as databases with group membership information, followed by over-the-air ("OTA") provisioning of group communication information to user mobile devices, such as smartphones.

Group communications may be particularly useful in conference or convention settings where like-minded users may be co-located. For example, an interest group at a comic book convention hall may wish to communicate as a PTT group while within the hall. Such settings often deploy numerous access points (or wireless network access points) for user devices to connect to wireless networks, and also may use speaker systems to distribute information relevant to users within audible range. For example, public address (PA) systems may be deployed within a convention or conference hall to broadcast music, schedules/venue information, and advertisements. However, speaker systems are not currently utilized to help mobile devices automatically join proximally-relevant communication groups or sessions.

SUMMARY

The various embodiments include a method for a mobile device to perform actions associated with applications when confirmed to be within proximity of a physical location relevant to the applications. An embodiment method may include identifying a unique identifier of a proximate wireless network access point, determining whether the unique identifier matches a predefined identifier stored on the mobile device and associated with an application, obtaining sensor data via a sensor within the mobile device in response to determining that the unique identifier matches the predefined identifier, processing the obtained sensor data to identify encoded information, determining whether the encoded information within the obtained sensor data is associated with the unique identifier, and performing an action based on the encoded information in response to determining that the encoded information is associated with the unique identifier. In an embodiment, the unique identifier may be one of a service set identifier (SSID) of the wireless network access point, a machine (MAC) address of the wireless network access point, and a special string indicating that the sensor data is available. In an embodiment, the sensor may be a microphone and the sensor data may be acoustic signals received by a microphone, the sensor may be a camera and the sensor data may be light signals and/or a quick response (QR) code scan, and/or the sensor may be an accelerometer and the sensor data may be vibrations of the mobile device. In an embodiment, acoustic signals received by the microphone may be at least one of music, an inaudible sound, a tone, and a beep, and may be emitted from a speaker system. In an embodiment, the encoded information may include at least one of a group communication identifier, an access code, login information, a time-to-live (TTL) value, a decryption key, a vocoder, a geofence information, billing information, authentication information, a non-broadcast SSID, and a URL/URI of a group communications server for a group communication session. In an embodiment, identifying a unique identifier of a proximate wireless network access point may include determining whether a predefined condition is met, wherein the predefined condition may correspond to one of an operating state of the mobile device, a time, and a location, and identifying the unique identifier of the wireless network access point on the proximate wireless network in response to determining that the predefined condition is met. In an embodiment, performing an action based on the encoded information in response to determining that the encoded information is associated with the unique identifier may include transmitting a join request message to a group communications server associated with the application based on the encoded information in response to determining that the encoded information is associated with the unique identifier. In an embodiment, the method may further include determining whether the proximate wireless network access point is available based on scanning operations with a wireless transceiver, obtaining the sensor data via the sensor in response to determining that the proximate wireless network access point is not available based on the scanning operations with the wireless transceiver, processing the obtained sensor data to identify the encoded information, wherein the encoded information may include at least a non-broadcast SSID of the proximate wireless network access point, determining whether the encoded information matches the predefined identifier stored on the mobile device and associated with the application, determining whether the mobile device can connect to the proximate wireless network access point based on the encoded information in response to determining that the encoded information matches the predefined identifier, and performing the action based on the encoded information in response to determining that the mobile device can connect to the proximate wireless network access point.

In another embodiment, a mobile device may include means for identifying a unique identifier of a proximate wireless network access point, means for determining whether the unique identifier matches a predefined identifier stored on the mobile device and associated with an application, means for obtaining sensor data in response to determining that the unique identifier matches the predefined identifier, means for processing the obtained sensor data to identify encoded information, means for determining whether the encoded information within the obtained sensor data is associated with the unique identifier, and means for performing an action based on the encoded information in response to determining that the encoded information is associated with the unique identifier.

In another embodiment, a mobile device may include a memory, a sensor, and a processor coupled to the memory and the sensor in which the processor may be configured with processor-executable instructions to perform operations including identifying a unique identifier of a proximate wireless network access point, determining whether the unique identifier matches a predefined identifier stored on the mobile device and associated with an application, obtaining sensor data via the sensor in response to determining that the unique identifier matches the predefined identifier, processing the obtained sensor data to identify encoded information, determining whether the encoded information within the obtained sensor data is associated with the unique identifier, and performing an action based on the encoded information in response to determining that the encoded information is associated with the unique identifier.

In another embodiment, a non-transitory processor-readable storage medium may have stored thereon processor-executable software instructions configured to cause a processor of a mobile device to perform operations that may include identifying a unique identifier of a proximate wireless network access point, determining whether the unique identifier matches a predefined identifier stored on a mobile device and associated with an application, obtaining sensor data via a sensor within the mobile device in response to determining that the unique identifier matches the predefined identifier, processing the obtained sensor data to identify encoded information, determining whether the encoded information within the obtained sensor data is associated with the unique identifier, and performing an action based on the encoded information in response to determining that the encoded information is associated with the unique identifier.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
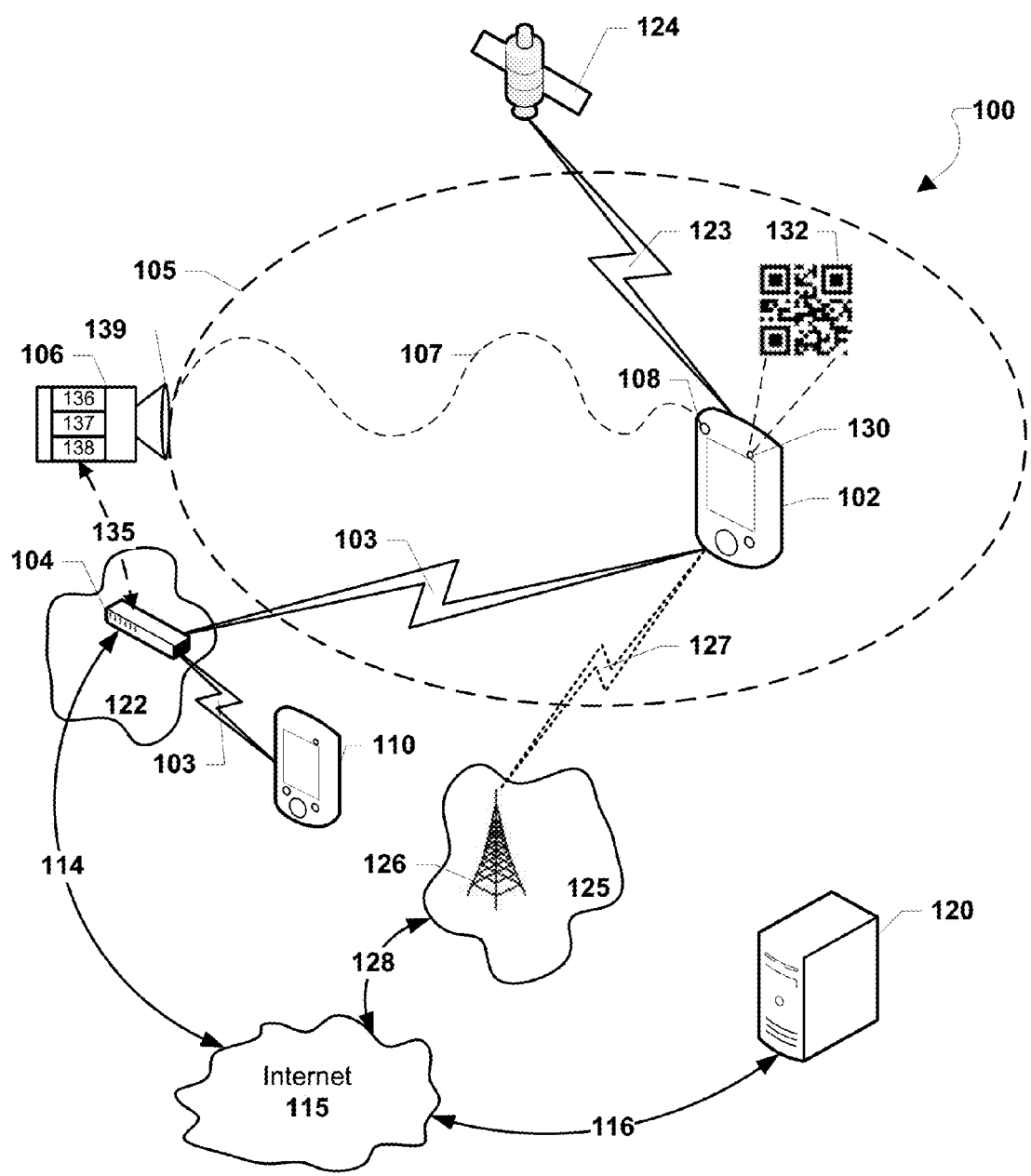
FIG. 1A is a component block diagram of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "mobile device" are used herein to refer to any one or all of cellular telephones, smart-phones (e.g., iPhone), web-pads, tablet computers, Internet enabled cellular telephones, WiFi enabled electronic devices, personal data assistants (PDA's), laptop computers, personal computers, and similar electronic devices equipped with at least a processor. In various embodiments, such devices may be configured with a network interface to establish a wide area network (WAN) or local area network (LAN) connection (e.g., an LTE, 3G or 4G wireless wide area network transceiver, a wired connection to the Internet, or WiFi), and further may include various sensors capable of receiving various sensor data, such as microphones that may capture acoustic signals (e.g., music, noises, etc.) and/or cameras that may capture light signals (e.g., blinking/flashing lights, Morse code, imagery, pictures, photos, QR code images, video, etc.).

The various embodiments provide systems, devices, and methods for a mobile device to perform actions associated with an application, such as a group communication application, when confirmed to be within proximity of a physical location relevant to that application. By identifying predefined unique identifiers (e.g., service set identifiers (SSIDs), machine (MAC) addresses, etc.) when connected to proximate wireless network access points, the mobile device may determine its proximity to areas relevant to particular applications on the mobile device, such as a conference room of a scheduled meeting/gathering/conference. To do so, the mobile device may begin using sensors to receive data from proximate data sources to confirm its proximity to the relevant areas. For example, mobile devices may utilize a microphone to capture sensor data that may include encoded information for confirming and/or joining a gathering/meeting/conference associated with a group communication application on the mobile device. In particular, the mobile device may receive and process acoustic signals (e.g., background music emitted from a PA system within earshot) that have a naturally limited transmission range, and may obtain from received acoustic signals encoded information that is highly local due to the limited transmission range. Using this combination of detecting predefined identifiers and received proximally-relevant information, the mobile device may automatically perform proximally-relevant operations, such as transmitting requests to join communication groups that are relevant to the user's particular location (e.g., room or zone within an arena). Because proximity and relevance to applications on the mobile device is confirmed, unintended actions may be avoided, such as participation of unregistered devices in a meeting via an application that is localized to a specification location (or a highly local position).

In various embodiments, a mobile device, such as a smartphone, may have various applications (or apps) installed/loaded. For example, a smartphone mobile device may be configured to use its applications processor to execute a group communication app, such as a QChat application. The mobile device may store a predefined list of unique identifiers that are associated with the various applications. For example, the mobile device may include a list or database of SSIDs that correspond to meetings scheduled to take place within a conference hall via a group communication application.

The mobile device may be configured to identify (and connect to) available wireless network access points, such as by scanning for and connecting via a wireless transceiver to WiFi routers of a local area network. Each wireless network access point may be associated with a unique identifier, such as its SSID, its MAC address, or a special string that identifies the wireless network access point and includes additional information. For example, a wireless network access point may broadcast an SSID that includes concatenated text indicating that there is music playing through nearby speakers that may be related to a group communication application (e.g., "meetingID_audioEnabled"). The mobile device may compare the unique identifier of proximate available wireless network access points to the predefined list of unique identifiers to find any matches, such as by performing lookups in a list of SSIDs stored within application data corresponding to installed apps.

As proximate wireless network access points may have overlapping broadcasts, especially in small areas like adjoining break-out rooms in a conference space, the mobile device may be in an area associated with an application (e.g., a communication group app), but not aware of or connected to the wireless network access point having an identifier associated with the application. For example, the mobile device may be connected to a wireless router with an SSID that does not correspond to a known, stored SSID for a group communication application. So, in an embodiment, the mobile device may be configured to iteratively evaluate (and connect to) various available wireless network access points to find matches to identifiers within its predefined list of identifiers associated with applications. In an embodiment, the mobile device may use signal strengths to determine the next wireless network access point to evaluate (and connect to) when iterating through the identifiers (e.g., SSIDs) of proximate wireless network access points. In another embodiment, the mobile device may be configured to use connected sensors (e.g., a camera) to detect quick response codes ("QR codes") that may indicate SSIDs or other unique identifiers most relevant to a particular room/section. For example, the mobile device may scan a QR code on the wall of a break-out room to obtain the SSID to which the mobile device may connect to receive or participate in a location-relevant service.

When a match is found between a unique identifier of a proximate wireless network access point and stored information associated with the device's applications, the mobile device may be considered to be in a location associated with a predefined action or to otherwise be of interest to the user of the mobile device. For example, based on a nearby router's SSID matching a stored identifier, the mobile device may be determined to be in the conference room associated with a schedule meeting to be held via a group communication application. However, the mobile device may be required to confirm the location as well as obtain additional information to use with associated applications. Thus, the mobile device may perform operations for obtaining sensor data via various sensors. Sensor data may be acoustic signals received by a microphone, light signals (e.g., flashing/blinking lights, Morse code, etc.) received by a camera, a QR code scanned by the camera, and vibrations received by an accelerometer. For example, the mobile device may use a microphone to receive acoustic signals (e.g., music, an ultrasound, an inaudible sound, a tone, a beep, etc.) playing on a proximate PA system or music player (e.g., from a speaker in the meeting room). In an embodiment, the mobile device may only activate sensors (e.g., a microphone) and/or begin receiving and processing sensor data in response to recognizing a known unique identifier of a proximate available wireless network access point in order to conserve power.

The mobile device may parse, demodulate, compare, convert, decrypt, decode, evaluate, and otherwise process any obtained sensor data to identify encoded information that may be related to the unique identifier and/or the associated applications. In particular, the mobile device may identify encoded information that may be used to cross-reference the unique identifier to confirm the mobile device is in the predefined place (and/or connected to the appropriate wireless network access point). In various embodiments, the encoded information may include embedded symbols, information, or demarcations that the mobile device may use to deduce boundaries within the obtained sensor data and determine the information that needs to be parsed and interpreted.

The encoded information may further be used by the mobile device to perform proximally-relevant actions, such as by indicating group communications server contact information for joining a communication group of the known meetings/conferences. For example, encoded information may include a group communication identifier, an access code, login information, a decryption key, a geofence information, billing information, authentication information, a non-broadcast SSID, a URL/URI or an IP address of a group communications server for a group communication session (or a URI associated with a conference/meeting), a linkage, a conference identifier (or ID), a password, a time of a meeting or time-to-live (TTL) value of a meeting, a hostname for conferencing, a call-setup for arbitration related issues, and a vocoder (or list of vocoders) that may be used by the mobile device via a group communication application associated with the unique identifier.

If the encoded information is relevant to the unique identifier, the mobile device may use the encoded information to perform various actions predetermined to be relevant to the location of the mobile device, such as launch applications, execute API commands or scripts, render messages to the user, and/or contact a communications server for joining a communication group associated with the unique identifier (and the location of the acoustic signals). For example, the mobile device may transmit a join request message that includes the unique identifier and at least one of a user ID, account credentials, a phone number for the mobile device, and a machine (MAC) address for the mobile device. As another example, in response to receiving and processing inaudible acoustic signals within a conference room having a WiFi router with a certain SSID, the mobile device may join a Q&A communication session via a group communication application that utilizes the PA system of the conference room.

In various embodiments, the mobile device may be configured to evaluate sensor data prior to scanning for available wireless network access points. For example, the mobile device may activate a camera to scan for sequences of light and, in response to determining that encoded information within the light sequences corresponds with a stored SSID related to a meeting to be held via a group communication app, the mobile device may activate a WiFi radio to scan for an associated wireless network access point. In other words, the mobile device may be configured to confirm it is in the right place to execute predefined, proximally-relevant actions (e.g., join a group, etc.) using sensor data and then available wireless network access points, and vice versa. In an embodiment, when no available wireless network access points are detected (e.g., no nearby wireless routers are configured to broadcast their SSID), the mobile device may evaluate sensor data from proximate data sources, such as PA speakers, to identify non-broadcast identifiers within encoded information. In another embodiment, the mobile device may be configured to utilize only sensor data to confirm it is located within proximity of a predefined area (e.g., a conference room) and perform proximally-relevant actions, such as join a communication group using contact information encoded within the sensor data.

In an embodiment, the mobile device may be configured to evaluate various conditions prior to monitoring for available wireless network access points and/or sensor data, such as acoustic signals from a PA system. For example, the mobile device may periodically evaluate current GPS coordinates, the time of day, applications active on the device, and other operating states or characteristics of the device against stored conditions that may be met in order to activate a wireless transceiver and scan for available wireless network access points. As another example, the mobile device may periodically evaluate current GPS coordinates against a predefined geofence of a convention center in order to activate a microphone and record ambient sounds.

By requiring a confirmation process based on sensor data and available wireless network access points within an area, the various embodiments may be valuable techniques for controlling data distributions and participations in group communications. For example, only mobile devices within proximity of a wireless router with a certain SSID and a PA system emitting acoustic signals having encoded group call provisioning information may detect and use the encoded information to join a special group communication. Thus, by checking whether unique identifiers (e.g., SSIDs) correspond to both available wireless network access points and encoded information within sensor data (e.g., acoustic signals, light signals, QR codes, vibrations, etc.) obtained only within a local area, the mobile device may ensure it is in the right place at the right time for performing predefined actions, such as joining location-relevant, secured group communications.

In addition to security and/or confirmation benefits, the various embodiment methods may enable mobile devices to conserve battery power. In particular, by intelligently activating and de-activating wireless transceivers and/or sensors (e.g., microphones), the embodiment methods may enable a mobile device to perform scanning operations or monitor for broadcast information only when necessary, thereby avoiding expending power performing unnecessary scans and thus extending battery life. For example, the mobile device may only activate a camera or microphone to obtain sensor data when a known wireless network access point associated with an application executing on the mobile device is determined to be within reception range.

FIG. 1A illustrates an embodiment communication system 100 that includes a first mobile device 102 and a second mobile device 110 both connected via wireless data links 103 to a wireless network access point 104, such as a WiFi router. For example, the mobile devices 102, 110 may exchange signals with the wireless network access point 104 using Bluetooth, WiFi, or other wireless protocols. The wireless network access point 104 may be included within a local area network 122 and may be connected to the Internet 115 via a wired or wireless connection 114. The communication system 100 may also include a group communications server 120 (or server computing device) having a wired or wireless connection 116 to the Internet 115. The group communications server 120 may be configured to perform operations for establishing and managing group communication sessions, including admitting devices to participate in sessions in response to receiving join request messages. The wireless network access point 104 and group communications server 120 may exchange data over the Internet 115 via the connections 114, 116, such as relayed join request messages and other group communications data (e.g., session authorizations, video conferencing data, VOIP data, etc.).

In an embodiment, the first mobile device 102 may be configured to exchange signals over a long-range wireless link 127 with a base station 126 (or cellular tower) that is associated with a cellular or mobile network 125. Such a mobile network 125 may provide the first mobile device 102 access to the Internet 115 via a connection 128. For example, using a cellular network transceiver to transmit the signals over the long-range wireless link 127, the first mobile device 102 may exchange data (e.g., join messages, communication session data, etc.) with the group communications server 120 via the mobile network 125.

In another embodiment, the first mobile device 102 may be configured to receive signals 123 from a global positioning system (GPS) satellite 124 in orbit above the first mobile device 102. The signals 123 may include GPS coordinates representing the location of the first mobile device 102, and may be processed by the first mobile device 102 to determine whether the first mobile device 102 has entered (or alternatively left) predefined geofence areas. In particular, the first mobile device 102 may compare GPS coordinates indicated by the signals 123 from the GPS satellite 124 to stored geofence information (e.g., perimeter GPS coordinates of a known building, street, zip code, etc.) to determine whether the first mobile device 102 is within a location that is associated with a group communication session and/or a group communication application executing on the first mobile device 102. For example, the first mobile device 102 may compare GPS coordinates from the signals 123 to a set of GPS coordinates stored in memory to determine whether the first mobile device 102 is within a geofence of a convention center.

The communication system 100 may further include a speaker system 106 that includes via one or more speakers 139 and that is configured to emit acoustic signals 107 (e.g., music, beeps, clicks, audible sounds, inaudible sounds, etc.), such as a public announcement system (PA system) or a music player. In an embodiment, the speaker system 106 may include a processor 136, a memory 137, and a network interface 138 and may be configured to communicate with the wireless network access point 104 via a wired or wireless connection 135. Via the connection 135 to the wireless network access point 104, the speaker system 106 may exchange messages over the Internet 115 and store data received from the group communications server 120. For example, the speaker system 106 may emit music via the acoustic signals 107 that is modulated to represent data received from the group communications server 120. In this way, the speaker system 106 when connected to the Internet 115 may be enabled to emit dynamic information over time.

The acoustic signals 107 may only be detectable (or captured) within an area 105 (e.g., within an enclosed room or building, within earshot, etc.), and thus the second mobile device 110 may not be capable of receiving the encoded information. However, being within the area 105, the first mobile device 102 can receive the acoustic signals 107 using a sensor, such as a microphone 108 embedded within the device's housing or otherwise connected to the first mobile device 102. The first mobile device 102 may be configured to demodulate and otherwise process the acoustic signals 107 to identify and utilize encoded information within the acoustic signals 107. For example, based on encoded information within the received acoustic signals 107, the first mobile device 102 may identify information for joining a group communication and may transmit a join request message over the Internet 115 via the wireless network access point 104 (e.g., a wireless router) to the group communications server 120.

In an embodiment, the first mobile device 102 may also be configured to utilize information within a QR code 132 within the area 105. In general, the QR code 132 may be a two-dimensional bar code having encoded information that may be read by a scanning device. In particular, the first mobile device 102 may include a camera 130 capable of reading or capturing imagery including the QR code 132. For example, in response to scanning the QR code 132 on a poster within the area 105, the processor of the first mobile device 102 may execute an application, software, routines, or other operations to process (or translate) the scanned imagery to identify information related to a communication session (e.g., time of a meeting, IP address for contacting the group communications server 120, etc.). While described in terms of a specific type of bar code, in the various embodiments the QR code 132 may be substituted with other linear or matrix barcodes, such as a High Capacity Color Barcode, PDF417 codes, etc.

In another embodiment, the speaker system 106 may include various equipment or components for emitting various types of signals having encoded information that may be received by the first mobile device 102 when within proximity. For example, the speaker system 106 may include a motor (not shown) configured to generate vibrations in patterns/sequences that may received via an accelerometer sensor within the first mobile device 102 (not shown) and decoded into useful information (e.g., commands, an SSID, instructions, communication group contact information, etc.) by the first mobile device 102. As another example, the speaker system 106 may include a light source (e.g., an LED light source, a bulb, etc.) (not shown) configured to generate light, symbols, or images in patterns/sequences that may received via the camera 130 within the first mobile device 102 and decoded into useful information (e.g., commands, instructions, communication group contact information, etc.) by the first mobile device 102. In other words, the speaker system 106 may be configured to broadcast various types of signals and sensor data for receipt by the first mobile device 102 when within proximity (e.g., in the same room, within earshot, within line-of-sight, etc.).

Figure 1B:
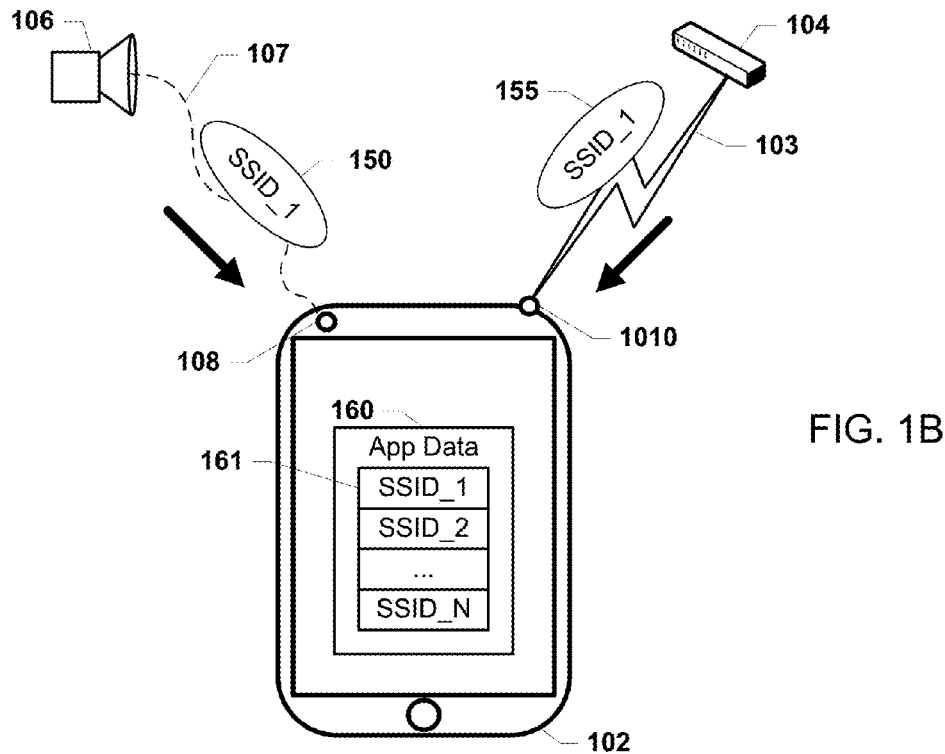
FIG. 1B is a component block diagram of an embodiment mobile device obtaining information from a wireless network access point and a speaker system.

FIG. 1B illustrates a mobile device 102 receiving information from a wireless network access point 104 and a speaker system 106. The speaker system 106 may be configured to modulate acoustic signals 107 to include encoded information. In particular, the speaker system 106 may emit (or broadcast) acoustic signals 107 encoded with data 150 indicating at least a unique identifier of the wireless network access point 104 (i.e., the SSID "SSID_1"). The first mobile device 102 may receive the acoustic signals 107 via a connected (or embedded) sensor, such as a microphone 108, and further may be configured to parse and otherwise interpret the acoustic signals 107 to identify the data 150.

Via the wireless data link 103 (e.g., WiFi communications), the first mobile device 102 may also receive data 155 (i.e., the SSID "SSID_1") broadcast from the wireless network access point 104. The first mobile device 102 may receive the broadcast data 155 via a wireless transceiver, such as a WiFi transceiver coupled to an antenna 1010. The data 155 from the wireless network access point 104 at the least may include identification information that identifies the wireless network access point 104, its associated network (e.g., LAN), and whether there are other associated devices and/or services available nearby. For example, the data 155 may include a token, modifier, character, or other information that indicates the acoustic signals 107 may be available for capture via microphone. In an embodiment, the wireless network access point 104 may not broadcast its associated SSID or other identification information, but instead may have a non-broadcast SSID to promote security or exclusivity of local area networks.

In various embodiments, the processor of the first mobile device 102 may process and compare the received data 150, 155 to application data 160 stored within the first mobile device 102. In particular, the data 150, 155 may be compared to a set 161 of predefined SSIDs recognized by the first mobile device 102. When the data 150, 155 matches stored application data 160, the first mobile device 102 may perform various actions using the data 150, 155. For example, the first mobile device 102 may be configured to use the data 150, 155 as input data for applications, such as addresses, scripts, instructions, or other information for joining a communication group.

Figure 1C:
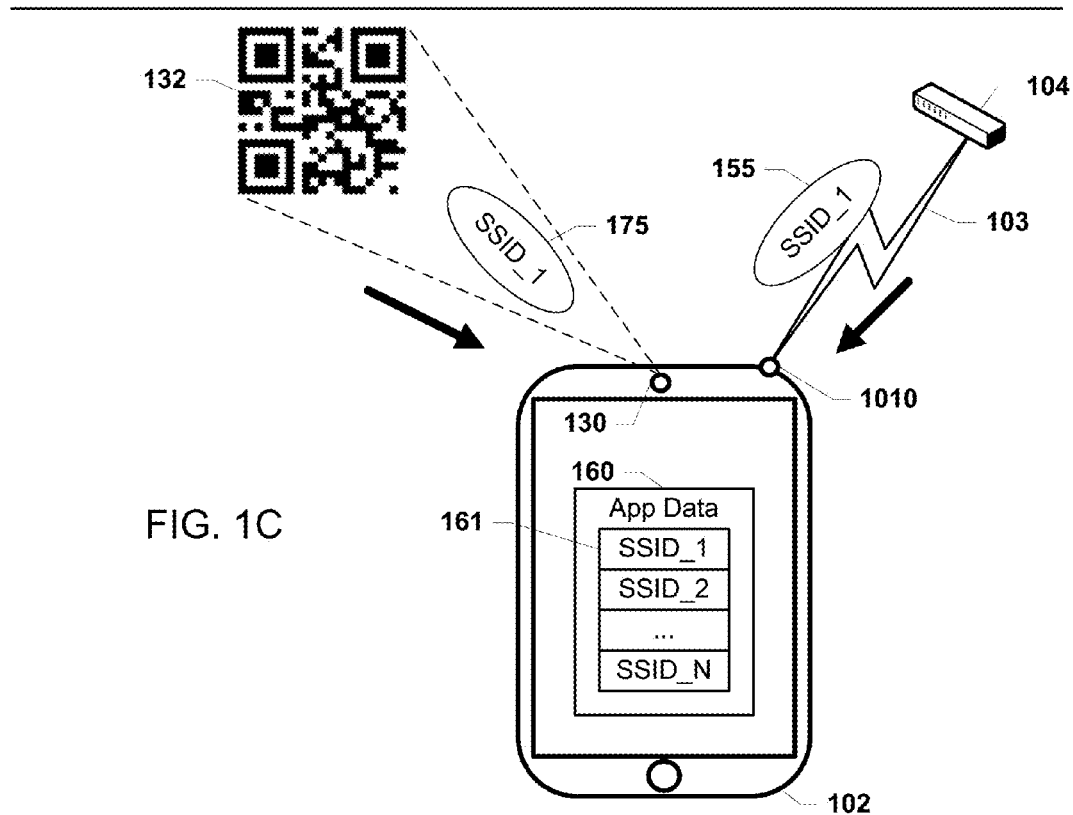
FIG. 1C is a component block diagram of an embodiment mobile device obtaining information from a wireless network access point and a quick response (QR) code.

FIG. 1C illustrates a mobile device 102 receiving information from a wireless network access point 104 and a scanned QR code 132. FIG. 1C is similar to FIG. 1B, except that instead of obtaining data from processing acoustic signals, the first mobile device may obtain data 175 by processing scanned imagery of the QR code 132. In particular, the first mobile device 102 may process a picture taken of the QR code 132 to identify the encoded information that at the least indicates a unique identifier of the wireless network access point 104 (i.e., the SSID "SSID_1"). As described above, via the wireless data link 103 (e.g., WiFi communications), the first mobile device 102 may also receive data 155 (i.e., the SSID "SSID_1") broadcast from the wireless network access point 104. Further, the processor of the first mobile device 102 may process and compare the data 175, 155 to application data 160 stored within the first mobile device 102, and when there is a match, the first mobile device 102 may be configured to perform various actions using the data 175, 155.

In various embodiments, the encoded information within sensor data, such as the acoustic signals 107 and/or QR codes 132, may include various types of information that may be used by the first mobile device 102. For example, encoded information may include an application identifier of an application (or app) associated with received sensor data or a location, various credentials for communicating with other devices (e.g., secret keys, a decryption key, login information, authentication information for joining a communications session with a group communications server, etc.), a group name, a group ID, originator information of the group, a time duration, and session information. As an example, a time-to-live value (TTL) may be encoded that indicates that a communication group may automatically terminate after the expiration of the time-to-live. As an example, a security code or a hash value may be included in the encoded information to authenticate the encoded information. As an example, geofence information, GPS coordinates, and/or a radius value may be included in the encoded information to indicate a geographic area corresponding to a communication group (e.g., communication devices outside the radius of the geofence may be prevented from joining the group communication or may be dropped from the group communication). As an example, billing information may be included in the encoded information that includes charging rules or codes, and other information corresponding to joining a group communication, such as billing/costs, messaging rates, connection charges, and the costs of the communication and what a user may be paying for by using the encoded information to join a group communication.

The encoded information may also include the data or information that devices may provide to a group communications server within a join request message. For example, the encoded information may include an indication of the required data fields in any join request message sent to the group communications server (e.g., username, phone number, device ID, location, hash code, carrier ID, etc).

The encoded information may include connection information that directs the first mobile device 102 to use a specific connection to join a group communication session. The connection information may include network information, such as the SSID of a specific Wi-Fi access point to use for the group communication (e.g., a hidden, non-broadcast SSID listed in the QR code but not broadcast by routers of the network), session information (e.g., host server name for the group communication session, URL/URI of the group communications server or a conference/meeting, vocoders to be used for the group communication session, etc.), and/or a IP address, hostname, or Uniform Resource Locator ("URL") of a server hosting connection set-up information for the group communication session. In this manner, the first mobile device 102 may receive the encoded information and identify connection information enabling the joining of a group communication session using a connection dedicated to the group communication session. In an embodiment, the encoded information may include details for joining a meeting/conference that utilizes PTT groups in association with a PA system.

Figure 2A:
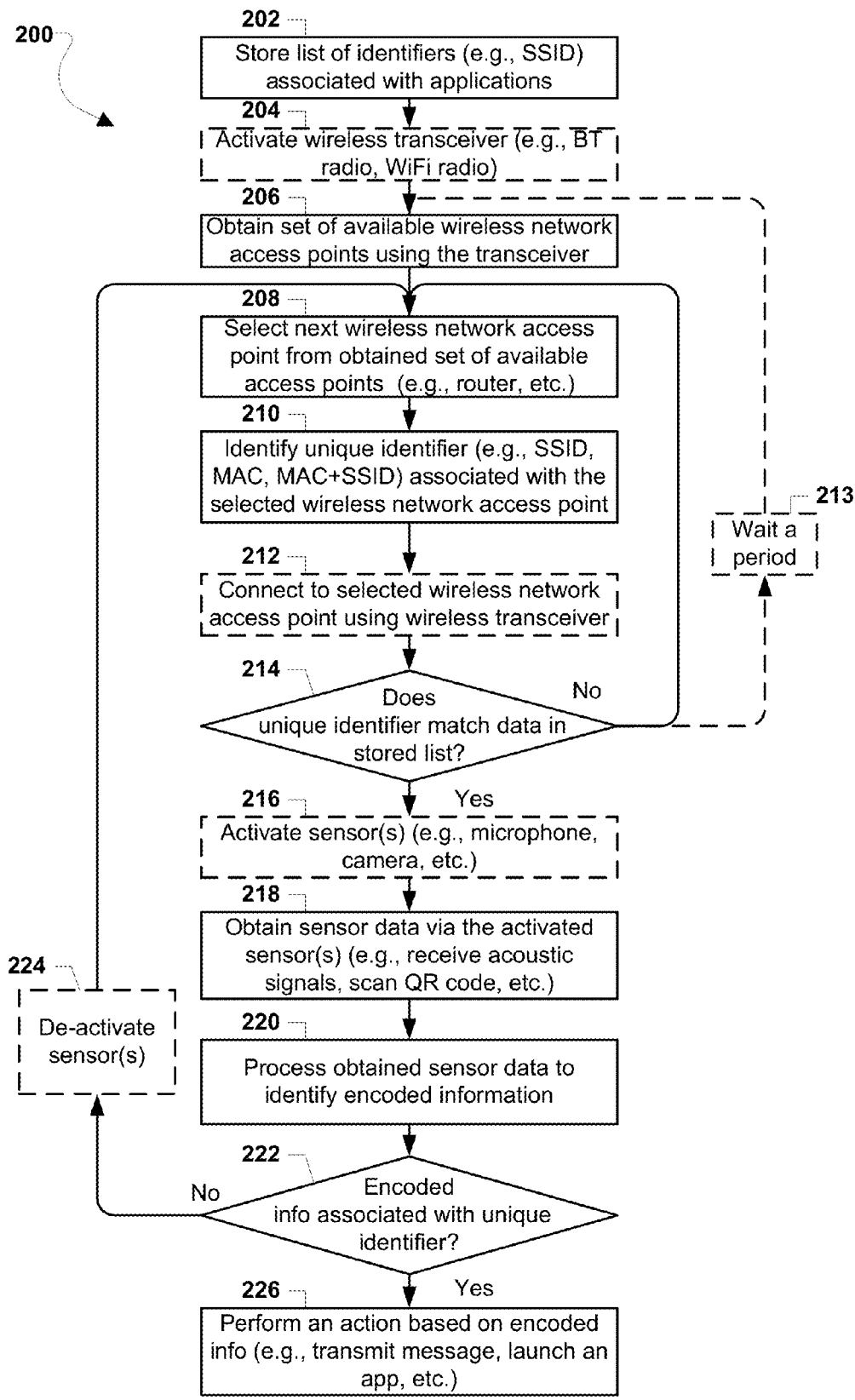
FIGS. 2A and 2B are process flow diagrams illustrating embodiment methods for a mobile device to perform an action based on information encoded within obtained sensor data.

FIG. 2A illustrates an embodiment method 200 for a mobile device to perform an action based on information encoded within sensor data, such as data identified within music emitted by a speaker system. The method 200 may be performed by a processor of the mobile device to confirm that the mobile device is within a predefined area by cross-checking available wireless network access points with information from sensor data that may only be received when within proximity of the area. For example, based on data identified within received music, the mobile device processor may confirm it is connected to a router associated with the conference room for a meeting the mobile device's user wants to participate in. In response to confirming proximity to the predefined area, the mobile device may automatically perform operations associated with the area, such as joining a conversation using a group communication application.

In block 202, the mobile device processor may store a list of identifiers (e.g., SSIDs) associated with applications of the mobile device. The list may be predefined based on previous operations of the mobile device, such as registration operations with a group communications server, user preferences, and/or received inputs (e.g., touch inputs) on the mobile device. For example, the list of identifiers may be downloaded and stored on the mobile device or alternatively may be entered via a user. In an embodiment, the list may include application data stored in relation to individual applications (or apps) or alternatively may be stored within a data table corresponding to a service (e.g., an operating system (OS) service, persistent routine, etc.). For example, the processor may execute a group communication app, such as QChat that may be associated with information within the stored list.

In an embodiment, the list of identifiers may be different based on the type of mobile device and/or the user of the mobile device. For example, the list of identifiers may include identifiers (e.g., SSIDs) that are only available certain groups of people, such as press members, developers, employees, or very important people (VIPs). As another example, in response to registering for a group communication related to a convention center, a first mobile device used by a center employee of the center may receive and store a first and second SSID and a second mobile device used by a common attendee of the center may only receive and store the first SSID.

The list of identifiers may or may not be identification information directly broadcast by wireless network access points (e.g., broadcast SSIDs). In other words, the list may include special data (e.g., codes, names, aliases, etc.) that may be generated from information broadcast by proximate wireless network access points. As described below, the identifiers may be information that results from the mobile device converting, decrypting, truncating, or otherwise changing information within identification information broadcast by proximate wireless network access points (e.g., SSIDs). In an embodiment, the list may include identifiers associated with previous group communication sessions, such as SSIDs or MAC addresses of wireless network access points that were used by the mobile device to participate in a previous video conference via an application.

In optional block 204, the processor may activate a wireless transceiver, such as a Bluetooth or WiFi radio. In various embodiments, the processor may selectively activate the wireless transceiver as described below in order to preserve power. In block 206, the processor may obtain a set of available wireless network access points using the wireless transceiver, such as by performing scanning operations using a WiFi radio. For example, the mobile device may perform scanning operations to detect available, proximate wireless routers and/or Bluetooth devices nearby. The wireless network access points of the obtained set may be considered proximate as the mobile device may only detect devices located close enough to exchange wireless signals (e.g., WiFi, Bluetooth, Zigbee, etc.).

The set of available wireless network access points may be a set of service set identifications (or SSIDs), such as a set of strings or labels corresponding to WiFi routers within a building or other area. SSIDs may be broadcast by wireless network access points to indicate the availability of services to devices within proximity. However, certain SSIDs may not be broadcast by wireless network access points (i.e., non-broadcast SSIDs), such as when local networks or wireless network access points are intended to be accessed by members of a known group and not the public. For example, a wireless router in a residence off a busy public sidewalk may be configured to not broadcast its SSID so that only occupants of the residence may know the router (and associated local area network) exists. Therefore, the obtained set may be generated by the mobile device by performing scanning operations to identify proximate wireless network access points configured to broadcast their SSIDs.

In an embodiment, the obtained set may be ordered based on signal strengths of the wireless network access points. For example, a first available wireless router with a strong signal may be higher in the set or indicated to be a higher priority, and a second available wireless router with a weak signal may be lower in the set or indicated to be a lower priority.

In an embodiment, the operations in 206 may further include testing known SSIDs to identify whether they are available at a given time. For example, the processor may perform operations to connect to a wireless network access point with a non-broadcast SSID to determine whether the wireless network access point is available and thus may be part of the obtained set of available wireless network access points. In an embodiment, the processor may compare current location information, such as current GPS coordinates received via a GPS receiver (or GPS chip), to stored data of known wireless network access points to determine whether known wireless network access points with non-broadcast SSIDs should be tested to determine their current availability. For example, the processor may compare current GPS coordinates of the mobile device to a stored data table of GPS coordinates (and tolerance thresholds) corresponding to all wireless routers with non-broadcast SSIDs to which the mobile device has previously connected or has been configured to connect, and may perform operations to contact wireless routers that are determined to be nearby and confirm (or deny) the wireless network access points' availability.

In block 208, the processor may select a next wireless network access point from the obtained set of available wireless network access points. For example, on the first iteration of performing the operations in the method 200, the processor may select the first wireless network access point in the set. In an embodiment, when the obtained set is ordered or prioritized, such as based on signal strength, the processor may select the next wireless network access point in order of priority or signal strength. For example, the next wireless network access point to be selected may be the next wireless network access point having the highest signal strength or priority. In another embodiment, if the obtained set of available wireless network access points is empty (i.e., there are no nearby wireless network access points), the next wireless network access point selected may be null (or a null value).

In block 210, the processor may identify a unique identifier associated with the selected wireless network access point. In particular, the unique identifier may be the SSID associated with the selected wireless network access point. However, the unique identifier may be any information that uniquely identifies the wireless network access point, such as a machine address (MAC) or combination of data (e.g., a MAC address concatenated with custom text, etc.). In an embodiment, the unique identifier may be an SSID that is a text representation of a group communication (e.g., "Group123-Meeting").

In an embodiment, information broadcast from wireless network access points, such as SSIDs obtained with scanning operations in block 206, may include additional data, messages, signals, instructions, or indicia that may be used by the mobile device, such as text appended to a unique name for the selected wireless network access point. For example, the broadcast SSID of the selected wireless network access point may be a special string that includes both a unique identifier predefined (or known) to the mobile device with other concatenated information. Accordingly, the processor may perform parsing, conversion, truncation, translation, or other processing operations to separate the unique identifier from such additional information. For example, the processor may identify the unique identifier associated with the selected wireless network access point by filtering the broadcast SSID with an equation, algorithm, or mask to identify the unique identifier. In an embodiment, the processor may subdivide a broadcast SSID of the selected wireless network access point to identify a unique token and an additional string that indicates related sensor data is available for receiving with a sensor. For example, by processing the SSID of the selected wireless network access point (e.g., "RouterA123_Check-for-Music"), the processor may identify a unique identifier associated with a group communication application (e.g., "RouterA123") and a message that indicates acoustic signals are available for receiving via a microphone (e.g., "Check-for-Music"). In other words, mobile devices may evaluate received SSIDs or identifiers to identify hints or clues regarding subsequent actions that may be performed to confirm that the mobile device is in a predefined area and/or receive additional information (e.g., contact information for a group communication server).

In an embodiment, if the obtained set of available wireless network access points is empty (i.e., there are no wireless network access points broadcasting their SSIDs), the next wireless network access point selected may be nothing or a null value, and thus the identified unique identifier may be a null value (e.g., an empty string).

In optional block 212, the processor may connect to the selected wireless network access point using the wireless transceiver. For example, the mobile device may connect via a WiFi transceiver to a wireless router within a conference room. The operations in optional block 212 may be optional as the mobile device may not be required to connect to the wireless network access point in order to determine the unique identifier (e.g., SSID) of wireless network access points. For example, proximate wireless network access points broadcasting corresponding SSIDs may be identified based on scanning operations alone. However, in other embodiments, the mobile device may connect to the selected wireless network access point to confirm stored data on the mobile device and otherwise verify whether the selected wireless network access point is known to the mobile device and its applications. In other words, the mobile device may connect to the selected wireless network access points with stored credentials (e.g., password, etc.) in order to receive subsequent information from the wireless network access point that may or may not change the identified unique identifier. For example, the unique identifier of the selected wireless network access point may be translated or otherwise converted into another identifier based on keys, instructions, or other information received when the mobile device is connected to the wireless network access point.

In determination block 214, the processor may determine whether the identified unique identifier matches data in the stored list. In other words, the processor may compare the identified unique identifier of an available wireless network access point to each predefined identifier stored within the mobile device (e.g., in a data table within stored application data, etc.) to determine whether the wireless network access point corresponds to a functionality, relationship, application, or other predetermined significance for the mobile device and its user. For example, the processor may compare the identified unique identifier to a list of SSIDs of wireless network access points known to be associated with a conference the user of the mobile device is currently attending. As another example, the processor may compare the identified unique identifier to a list of PTT or video conference session identifiers stored in a table of communication groups in which the user of the mobile device has registered to participate.

If the unique identifier is determined to not match data in the stored list (i.e., determination block 214="No"), the processor may continue with the operations in block 208 by selecting the next available wireless network access point in the obtained set. In an embodiment, the processor may periodically refresh the set of available wireless network access points and may loop indefinitely, for a predetermined number of loops, or until a wireless network access point with a known unique identifier is found. Thus, in an optional embodiment, if the unique identifier is determined to not match data in the stored list (i.e., determination block 214="No"), the processor may wait a period in optional block 213, such as busy-waiting for a predefined number of milliseconds, and may obtain a new set of available wireless network access points in block 206. For example, when the processor has evaluated all currently available wireless network access points and no unique identifier matches data in the stored list, the processor may refresh the set and evaluate all wireless network access points again.

However, if the processor determines that the unique identifier matches data in the stored list (i.e., determination block 214="Yes"), in optional block 216, the processor may activate a sensor (or sensors) if the sensor(s) is not already activated, such as a microphone, a camera, an accelerometer, and/or a gyroscope. The processor may be configured to selectively activate such sensors to conserve power. In block 218, the processor may obtain sensor data via the activated sensor (or sensors). For example, the processor may obtain data from acoustic signals (e.g., music, noises, beeps, inaudible sounds, etc.) received using an activated microphone. As another example, the processor may obtain data from light signals (e.g., a QR code scanned image, Morse code, patterns and/or sequences of flashing lights, patterns and/or sequences of colored lights, etc.). As another example, the processor may obtain data from vibration signals (e.g., patterns and/or sequences of rumbles, knocks, or vibrations, etc.). In various embodiments, the mobile device may be configured to record, capture, and otherwise receive and buffer sensor data for various periods of time. For example, in order to receive a complete message via acoustic signals, the mobile device may be configured to record audio via a microphone for a predetermined period of time that is longer than a length of messages conveyed via acoustic signals.

In an embodiment, the processor may obtain sensor data from a plurality of sensors at the same time. For example, the processor may activate a camera and a microphone to simultaneously record acoustic signals and light signals emitted by a speaker system located within the same room. Such simultaneously received sensor data may be redundant, or alternatively may be combined by the processor to generate a complete message as described below.

In block 220, the processor may process the obtained sensor data to identify encoded information. The processor of the mobile device may demodulate, convert, filter, decrypt, decode, parse, and perform various operations to identify messages, data, and relevant information encoded within the obtained sensor data. For example, the processor may demodulate microphone sensor data (e.g., received acoustic signals) to identify a message, command, codes, or other data related to a group communication application or functionality. As another example, the processor may evaluate video data captured by a camera to obtain a message encoded within a sequence of flashing lights. In an embodiment, sensor data may be formatted to include known embedded demarcation tokens to indicate how the processor may parse sensor data and identify individual data. For example, acoustic signals may be demodulated by the processor to identify syncing demarcations or other indicators of the frequency or interval of encoded information within the signals. In an embodiment, the processor may utilize the identified unique identifier (or information associated with the related application or application profile) as a decryption key to decode or otherwise access the encoded information.

As described above, in various embodiments, the processed sensor data may include encoded information relevant to joining a group communication. For example, the processor may demodulate received acoustic signals to identify encoded information that indicates an IP address, a URL, or a SIP of a group communications server, a group ID, a linkage, a conference ID, an access code or password, and a time (or time-to-live (TTL)) of a meeting. As another example, the encoded information may include passwords, meeting times, session preferences (e.g., language, topics, volume levels, etc.), and location information relevant to the group communication (e.g., the area within a conference hall associated with a conference call).

In an embodiment, the processor may be configured to combine sensor data obtained or received from more than one sensor to identify encoded information. The processor may be configured to interlace, concatenate, or merge decoded information from a first sensor (e.g., sensor data from a microphone) with decoded information from a second sensor (e.g., sensor data from a camera) to generate a complete message. For example, the processor may add a segment of decoded information from an acoustic signal to the end (or beginning) or a segment of decoded information from light signals. The processor may also be configured to use sensor data from a first sensor to process sensor data from a second sensor. For example, the processor may process a segment of decoded information from an acoustic signal to generate a decryption key that may be applied to decoded information from a received light signal to generate an IP address of a group communications server.

In determination block 222, the processor may determine whether the encoded information is associated with the unique identifier. The processor may evaluate the encoded information identified based on processing the obtained sensor data to determine whether the encoded information references the unique identifier. For example, the processor may determine whether the encoded information indicates or includes an SSID that matches the SSID identified with the operations in block 210. The processor may also utilize codes or other descriptive information within the encoded information to make the determination, such as by cross referencing a alphanumeric value indicated in the encoded information with a stored alphanumeric value stored in relation to the unique identifier (or the selected wireless network access point) within the mobile device (e.g., within a application data table). In various embodiments, the processor may determine whether any or all of the encoded information is associated with the unique identifier. For example, the processor may compare the entire encoded information to the unique identifier to determine whether there is a match. As another example, the processor may parse the encoded information into data segments and determine whether any of the data segments matches to the SSID unique identifier (i.e., determine whether the SSID is included within the encoded information). In an embodiment, the unique identifier may be used as a demarcation token for parsing the encoded information.

If the processor determines that the encoded information is not associated with the unique identifier (i.e., determination block 222="No"), the processor may de-activate the sensor (or sensors) in optional block 224 and may continue to select a next wireless network access point from the obtained set in the operations in block 208. However, if the processor determines that the encoded information is associated with the unique identifier (i.e., determination block 222="Yes"), the processor may be considered to have confirmed it is within proximity of a predefined area (e.g., a conference room associated with a registered group communication session). Thus, the processor may perform an action based on the encoded information in block 226, such as transmit a join message request to a group communications server. For example, the processor may generate a message based on formatting information within the encoded information (e.g., message/packet type, size, demarcation symbols, message encoding/encryption type, etc.) and may transmit the message based on contact information within the encoded information (e.g., a destination IP address, recipient device phone number, etc.). As another example, the processor may launch an application based on a command within the encoded information. As another example, the processor may present information to the user, such as by rendering via an attached LED screen or an audio sample via a speaker embedded in the mobile device housing a message (e.g., "You've arrived in the room for your pre-registered conference talk!") or notification (e.g., a beep, graphic, etc.). In an embodiment, the processor may perform a script or other instructions based on the encoded information. For example, the encoded information may include an API call associated with an application or service that the processor may execute in response to determining that the encoded information is associated with the SSID of the selected wireless network access point.

Figure 2B:
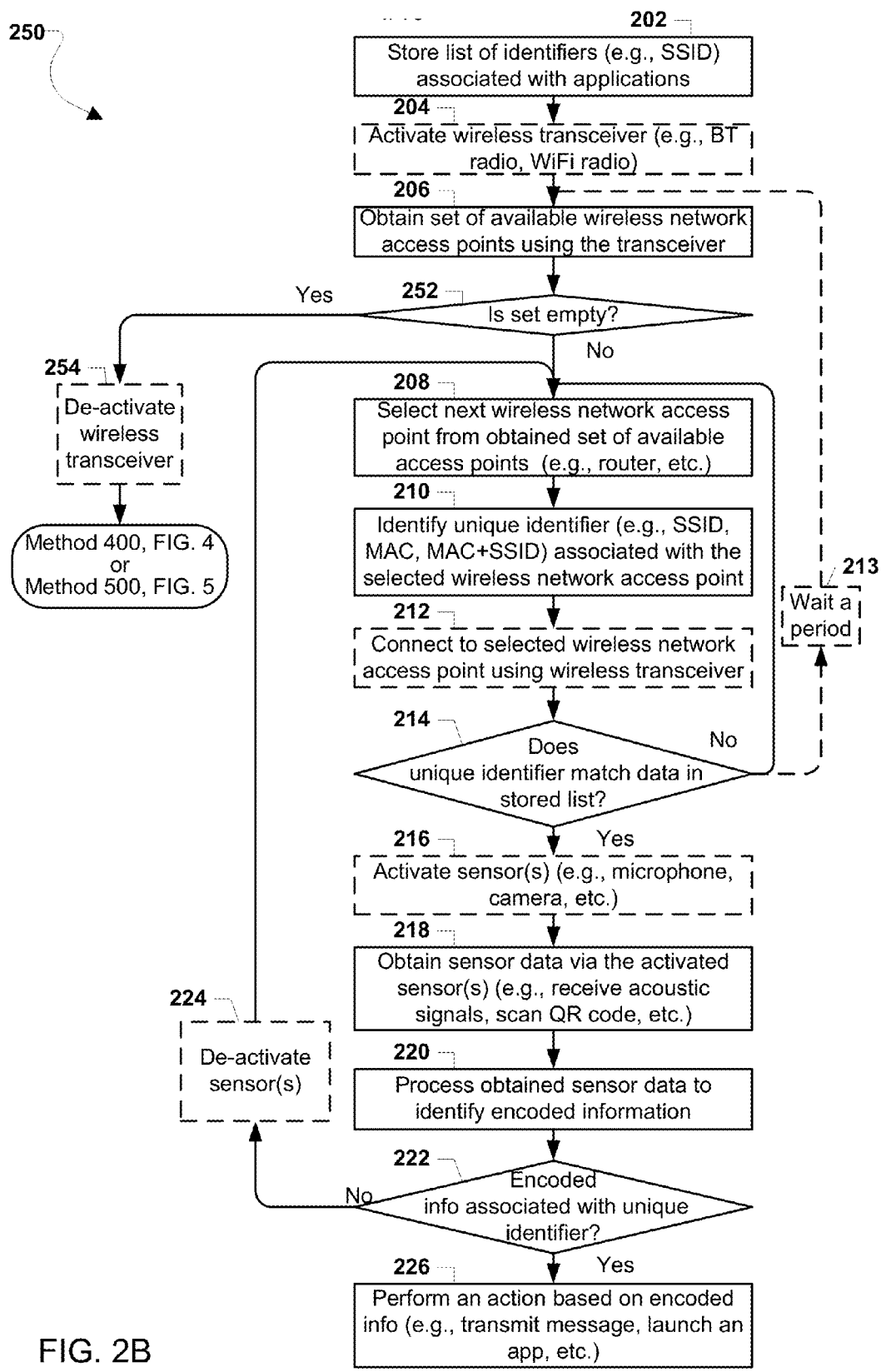

FIG. 2B illustrates an embodiment method 250 for a mobile device to perform an action based on information encoded within sensor data. The method 250 is similar to the method 200 described above with reference to FIG. 2A, except that in method 250 the mobile device processor may perform operations for enabling the mobile device to receive and evaluate sensor data when no proximate wireless network access points are determined to be available. In this way, regardless of whether wireless network access points in an area broadcast their SSID or other identifiers, the mobile device processor may be able to identify non-broadcast SSIDs or other identifiers within sensor data (e.g., sounds, QR codes) and continue to confirm whether the mobile device may perform actions relevant to predefined areas (e.g., convention rooms associated with pre-registered group communications). For example, the processor may do a scan for any wireless routers associated with SSIDs stored within a predefined list, and in response to finding no known wireless routers, the processor may turn on a microphone to obtain acoustic signals indicating non-broadcast SSIDs corresponding to an area.

In block 202, the mobile device processor may store a list of identifiers (e.g., SSIDs) associated with applications of the mobile device, and may activate a wireless transceiver in optional block 204. In block 206, the processor may obtain a set of available wireless network access points using the transceiver, such as by performing scanning operations using a WiFi radio.

In determination block 252, the processor may determine whether the obtained set is empty, such as by evaluating the entries in an obtained array (or other data structure) to determine whether there are any non-null (or non-empty) values corresponding to available wireless network access points. If the processor determines the obtained set is empty (i.e., determination block 252="Yes"), in optional block 254, the processor may de-activate the wireless transceiver (e.g., WiFi radio, etc.) and may continue to perform the method 400 or the method 500 described below with reference to FIG. 4 and FIG. 5, respectively.

If the processor determines the obtained set is not empty (i.e., determination block 252="No"), in block 208, the processor may select a next wireless network access point from the obtained set of available wireless network access points. In block 210, the processor may identify a unique identifier associated with the selected wireless network access point. In optional block 212, the processor may connect to the selected wireless network access point using the wireless transceiver. In determination block 214, the processor may determine whether the identified unique identifier matches data in the stored list. If the unique identifier is determined to not match data in the stored list (i.e., determination block 214="No"), the processor may continue with the operations in block 208 by selecting the next available wireless network access point in the obtained set. In an optional embodiment, if the unique identifier is determined to not match data in the stored list (i.e., determination block 214="No"), the processor may wait a period in optional block 213, such as busy-waiting for a predefined number of milliseconds, and may obtain a new set of available wireless network access points in block 206.

However, if the unique identifier is determined to match data in the stored list (i.e., determination block 214="Yes"), in optional block 216, if not already activated, the processor may activate a sensor (or sensors), such as a microphone, a camera, an accelerometer, and/or a gyroscope. In block 218, the processor may obtain sensor data via the activated sensor (or sensors). In block 220, the processor may process the obtained sensor data to identify encoded information. In determination block 222, the processor may determine whether the encoded information is associated with the unique identifier. If the processor determines that the encoded information is not associated with the unique identifier (i.e., determination block 222="No"), the processor may de-activate the sensor (or sensors) in optional block 224 and may continue to select a next wireless network access point from the obtained set in the operations in block 208. However, if the processor determines that the encoded information is associated with the unique identifier (i.e., determination block 222="Yes"), the processor may perform an action based on the encoded information in block 226, such as transmit a join message request to a group communications server.

Figure 3:
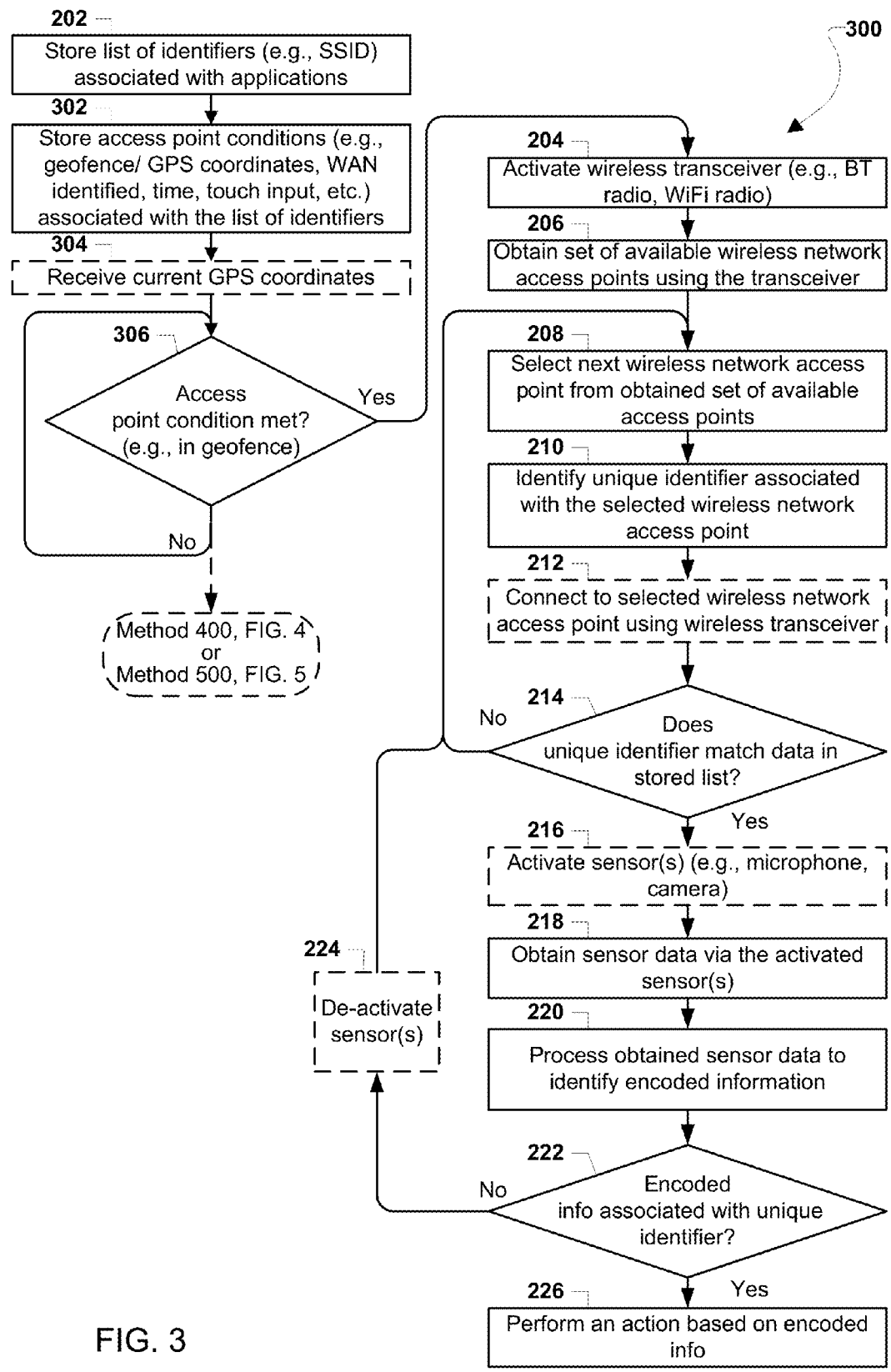
FIG. 3 is a process flow diagram illustrating an embodiment method for a mobile device to perform an action based on information encoded within sensor data obtained when a predefined condition is met.

FIG. 3 illustrates an embodiment method 300 for a mobile device to perform an action based on information encoded within sensor data obtained when a condition is met. The method 300 is similar to the method 200 described above, except that in method 300 the mobile device processor may perform operations for evaluating predefined conditions to determine whether to begin scanning for available wireless network access points. This may be important technique for conserving power, as the wireless transceiver of the mobile device may be activated only when the mobile device is within an area or experiencing a predefined operating condition that is associated with a list of identifiers. For example, the mobile device processor may only start scanning for available wireless network access points in response to determining it is a few minutes before a stored start time for a group PTT communication session.

In block 202, the mobile device processor may store a list of identifiers (e.g., SSIDs) associated with applications of the mobile device. In block 302, the processor may store access point conditions associated with the list of identifiers. Access point conditions may include predefined conditions, rules, thresholds, occurrences, or other parameters that may trigger the processor to activate a wireless transceiver, such as a WiFi radio, and perform scanning operations to find available wireless network access points (e.g., routers, etc.). In particular, access point conditions may include an operating state (e.g., battery charge, applications launched, components activate, etc.), a time or period of time (e.g., a day of the week, month, year, etc.), and/or a location (e.g., a town, a state, a building, GPS coordinates, a geofence boundary, etc.). For example, an access point condition may include whether the mobile device's current GPS coordinates are within a certain range of defined GPS coordinates of a known building. As another example, an access point condition may include whether the current time of day is within a threshold of the starting time for an online meeting indicated within a calendar service, an email client, and/or a conferencing application executing on the mobile device. Access point conditions may also include events or occurrences, such as whether a certain application executing in the foreground of the mobile device, whether a connection to a particular wide area network (WAN) via a cellular network chip is established, whether a message or message type is received or transmitted (e.g., an SMS text message is received/sent to a certain recipient, etc.), and/or whether a particular input is received (e.g., a user touch input, a button press, a shake/motion detection, etc.). For example, an access point condition may include whether the mobile device has full or limited service for a certain carrier/subscription/technology associated with a SIM within the mobile device. As another example, an access point condition may include whether a PTT service or routine is currently executing or whether a video call application has been launched on the mobile device.

The mobile device may store the access point conditions within a data table or other data structure that links the identifiers in the stored list with various predefined access point conditions. For example, the mobile device may link a SSID identifier associated with a scheduled group communication with a time of day. As another example, the mobile device may link the SSID identifier associated with the scheduled group communication with a time of day, a battery charge level, and/or certain GPS coordinates.

In optional block 304, the processor may receive current GPS coordinates, such as via a GPS receiver or chip. In determination block 306, the processor may determine whether an access point condition has been met. In particular, the processor may compare the current operations, location, and other characteristics of the mobile device to the stored access point conditions to determine whether there are any matches. For example, the processor may evaluate the current GPS coordinates of the mobile device to determine whether the mobile device location is currently within a predefined geofence or otherwise within a range of GPS coordinates indicated within the stored access point conditions. If the processor determines that no access point condition is met (i.e., determination block 306="No"), the processor may continue to evaluate current conditions (e.g., time, location, operating parameters, etc.) in the operations of determination block 306 until an access point condition is met.

In an optional embodiment, if the mobile device processor determines that no access point condition is met (i.e., determination block 306="No"), the processor may perform the operations in the method 400 or the method 500 described below with reference to FIG. 4 or FIG. 5, respectively. In other words, the mobile device processor may perform operations to utilize sensors instead of a wireless transceiver to identify information associated with the stored list of identifiers. For example, when no access point condition is met, the processor may determine whether any sensor condition is met by execute the method 500 described below.

If the processor determines that an access point condition is met (i.e., determination block 306="Yes"), in block 204, the processor may activate a wireless transceiver, such as a Bluetooth or WiFi radio, and may obtain a set of available wireless network access points using the transceiver in block 206, such as by performing scanning operations using a WiFi radio. In block 208, the processor may select a next wireless network access point from the obtained set of available wireless network access points and may identify a unique identifier associated with the selected wireless network access point in block 210. In optional block 212, the processor may connect to the selected wireless network access point using the wireless transceiver. In determination block 214, the processor may determine whether the identified unique identifier matches data in the stored list. If the unique identifier is determined to not match data in the stored list (i.e., determination block 214="No"), the processor may continue with the operations in block 208 by selecting the next available wireless network access point in the obtained set.

However, if the unique identifier is determined to match data in the stored list (i.e., determination block 214="Yes"), in optional block 216, if not already activated, the processor may activate a sensor (or sensors), such as a microphone, a camera, an accelerometer, and/or a gyroscope. In block 218, the processor may obtain sensor data via the activated sensor (or sensors). In block 220, the processor may process the obtained sensor data to identify encoded information. In determination block 222, the processor may determine whether the encoded information is associated with the unique identifier. If the processor determines that the encoded information is not associated with the unique identifier (i.e., determination block 222="No"), the processor may de-activate the sensor (or sensors) in optional block 224 and may continue to select a next wireless network access point from the obtained set in the operations in block 208. However, if the processor determines that the encoded information is associated with the unique identifier (i.e., determination block 222="Yes"), the processor may perform an action based on the encoded information in block 226, such as transmit a join message request to a group communications server.

Figure 4:
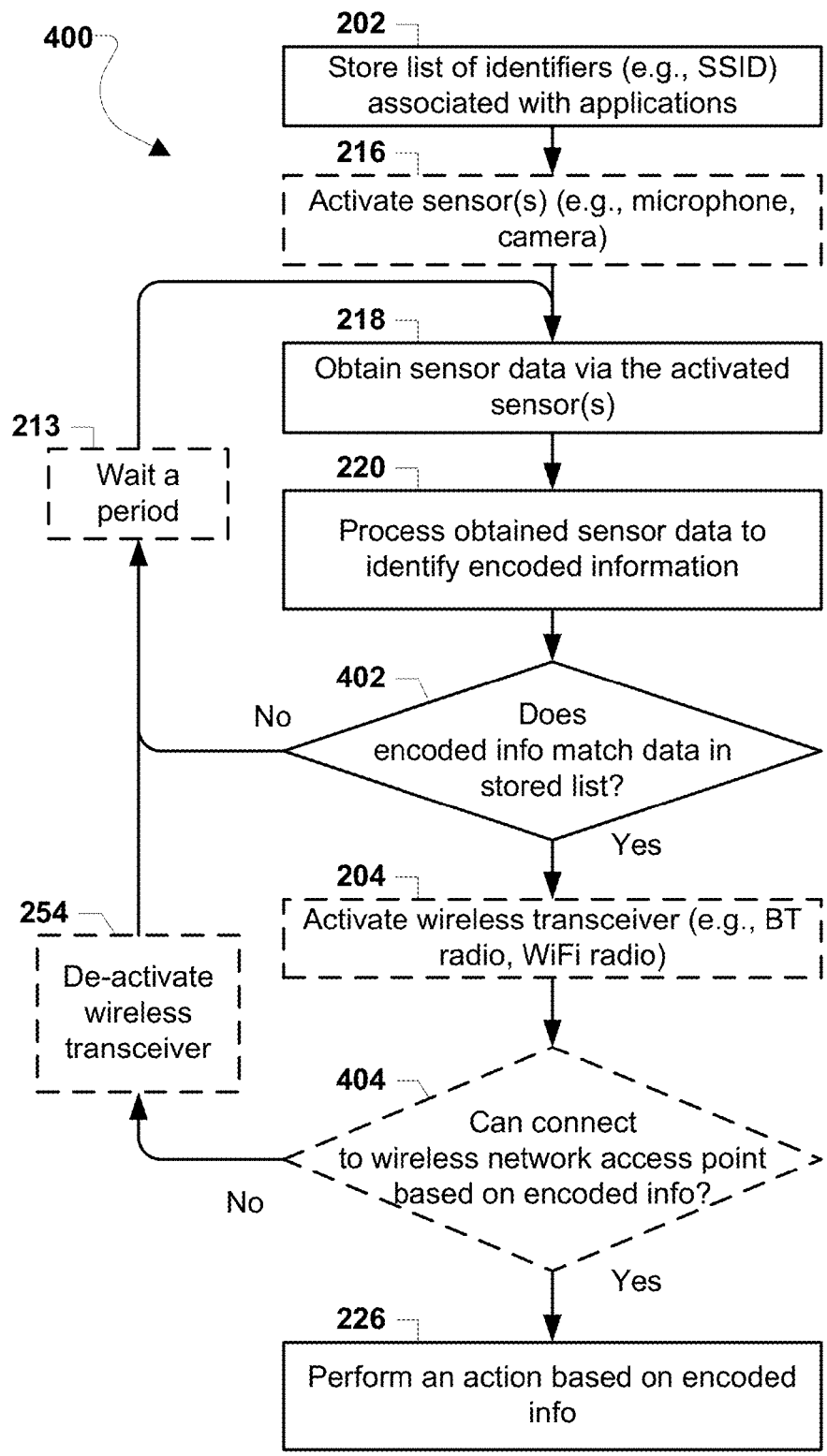
FIG. 4 is a process flow diagram illustrating an embodiment method for a mobile device to perform an action based on information encoded within obtained sensor data.

FIG. 4 illustrates an embodiment method 400 for a mobile device to perform an action based on information encoded within sensor data, such as data within acoustic signals (e.g., music) emitted by a speaker system (e.g., PA system). The method 400 is similar to the method 200 described above, except that in method 400 the mobile device processor may utilize activated sensors and sensor data prior to determining available wireless network access points with a wireless transceiver. This may be an alternative technique for conserving power by configuring the mobile device to only utilize the power hungry wireless transceiver to perform scanning operations when sensor data indicates the mobile device is within proximity of a predefined area associated with an application. For example, the mobile device may only scan for proximate WiFi routers when encoded information from processed acoustic signals indicate there should be an available router with a SSID related to an upcoming group meeting via a chat application.

In block 202, the mobile device processor may store a list of identifiers (e.g., SSIDs) associated with applications of the mobile device. In optional block 216, the processor may activate a sensor (or sensors), such as a microphone, accelerometer, and/or a camera. In block 218, the processor may obtain sensor data via the activated sensor (or sensors), such as by receiving acoustic signals emitted by a speaker system via a microphone, and may process the obtained sensor data to identify encoded information in block 220.

In determination block 402, the processor may determine whether the encoded information matches data in the stored list. The operations in determination block 402 may be similar to the operations described above with reference to determination block 214. For example, the processor may compare an SSID identified within the encoded information of the obtained sensor data to SSIDs in the stored list. If the processor determines that the encoded information does not match data in the stored list (i.e., determination block 402="No"), the processor may wait a period in optional block 213, such as by busy-waiting a predefined number of milliseconds, and then may continue to obtain sensor data in the operations in block 218. For example, the processor may obtain a different type of sensor data using a different sensor, such as by obtaining a scan of a QR code for processing instead of acoustic signals.

If the processor determines that the encoded information does match data in the stored list (i.e., determination block 402="Yes"), in optional block 204, the processor may activate a wireless transceiver, such as a WiFi or Bluetooth radio. In optional determination block 404, the processor may determine whether it can connect to a wireless network access point based on the encoded information. In particular, the processor may perform operations to connect to a wireless network access point having an SSID indicated in the encoded information and listed in the stored list. The processor may or may not scan for available wireless network access points in the operations in optional determination block 404. For example, the processor may simply transmit messages using an SSID indicated within the encoded information to connect to that wireless network access point if it exists. This technique may be useful when wireless network access points do not broadcast their SSIDs. As an alternative example, the processor may first scan for all available wireless network access points, determine whether the SSID indicated in the encoded information is available based on the scanned list, and then connect to the wireless network access point associated with the SSID. In an embodiment, the encoded information may also include other data needed by the mobile device to connect to the wireless network access point, such as a password or key. If the mobile device cannot connect to the wireless network access point based on the encoded information (i.e., optional determination block 404="No"), in optional block 254 the processor may de-activate the wireless transceiver, wait a period in optional block 213, and may continue to obtain sensor data with the operations in block 218. However, if the mobile device can connect to the wireless network access point based on the encoded information (i.e., optional determination block 404="Yes"), the processor may perform an action based on the encoded information in block 226, such as transmit a join message request to a group communications server indicated in the encoded information.

Figure 5:
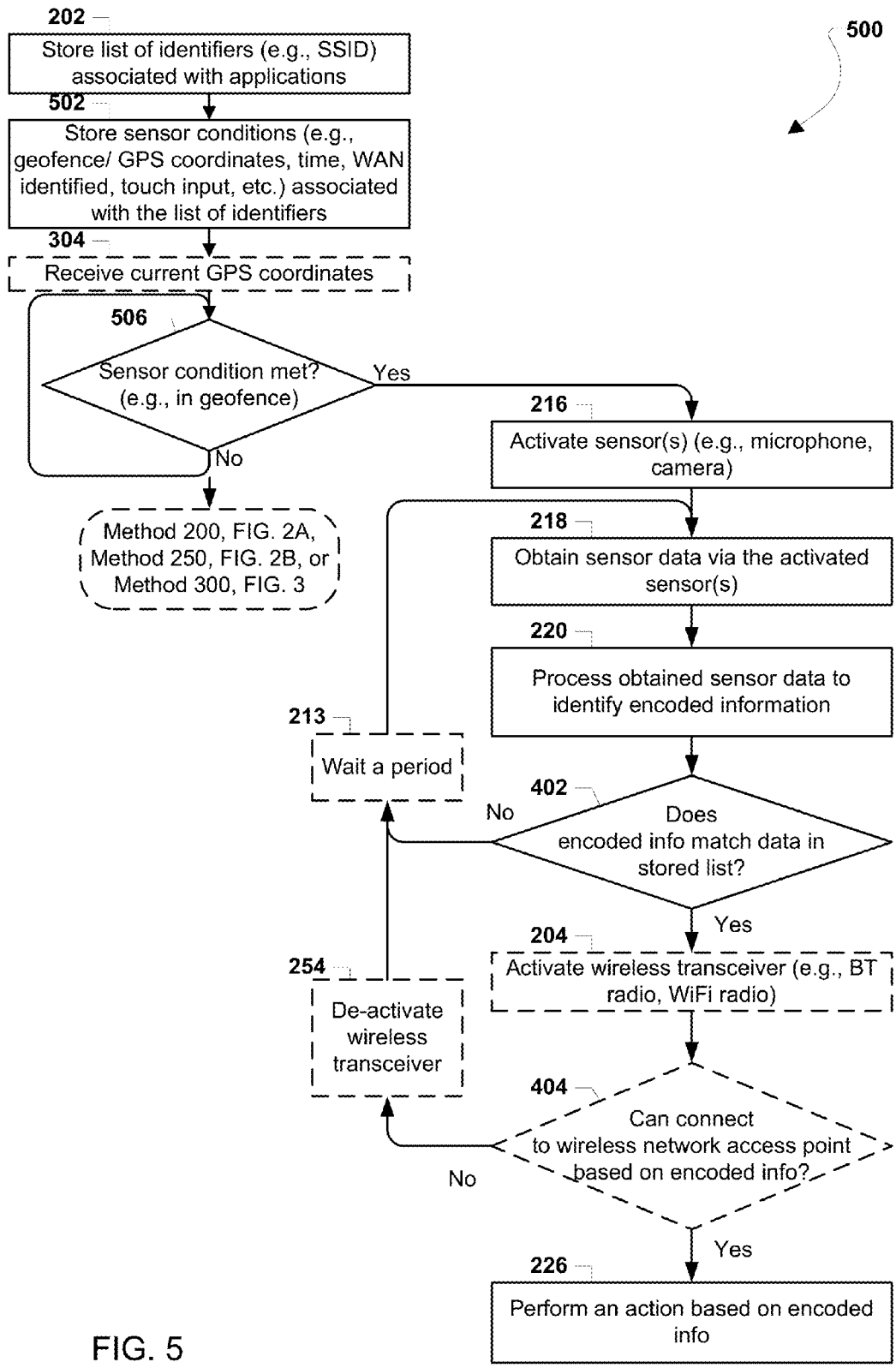
FIG. 5 is a process flow diagram illustrating an embodiment method for a mobile device to perform an action based on information encoded within sensor data obtained when a predefined condition is met.

FIG. 5 illustrates an embodiment method 500 for a mobile device to perform an action based on information encoded within sensor data obtained when a condition is met. The method 500 is similar to the method 400 described above, except that in method 500 the mobile device processor may perform operations for evaluating predefined conditions to determine whether to begin receiving sensor data. This may be an important technique for conserving power, as the various sensors, such as microphones and cameras, may be activated only when the mobile device is within an area or experiencing a predefined operating condition that is associated with a list of identifiers. For example, the mobile device may only start capturing imagery with a camera in response to determining it is a few minutes before a stored start time for a group PTT communication session.

In block 202, the mobile device processor may store a list of identifiers (e.g., SSIDs) associated with applications of the mobile device. In block 502, the processor may store sensor conditions associated with the list of identifiers. When the processor determines one or more of the sensor conditions (or predefined conditions) to exist, the processor may activate a sensor (or sensors), such as a microphone and/or a camera, and perform operations to scan for and receive sensor data, such as by receiving acoustic signals with the microphone. Such sensor conditions may be similar to the access point conditions described above. For example, sensor conditions may include operating conditions (e.g., battery charge, applications launched, components activate, etc.), a time or period of time (e.g., a day of the week, month, year, etc.), and/or a location (e.g., a town, a state, a building, GPS coordinates, a geofence boundary, etc.), and/or events or occurrences, such as whether a certain application executing in the foreground of the mobile device, whether a connection to a particular wide area network (WAN) via a cellular network chip is established, whether a message or message type is received or transmitted (e.g., an SMS text message is received/sent to a certain recipient, etc.), and/or whether a particular input is received (e.g., a user touch input, a button press, a shake/motion detection, etc.). In an embodiment, access point conditions and sensor conditions may be the same, or alternatively, sensor conditions may have different threshold values than similar access point conditions. For example, a sensor condition may require the battery charge to be above a first threshold before activating sensors for receiving sensor data and an access point condition may require the battery charge to be above a second threshold before activating the wireless transceiver for scanning operations.

Similar to as described above with reference to predefined access point conditions, the mobile device may store the sensor conditions within a data table or other data structure that links the identifiers in the stored list with various sensor conditions. For example, the mobile device may link a SSID identifier associated with a scheduled group communication with a time of day. In an embodiment, sensor conditions and access point conditions described above may be stored within the same database, data table, or other data structure.

In optional block 304, the processor may receive current GPS coordinates, such as via a GPS receiver or chip. In determination block 506, the processor may determine whether a sensor condition has been met. The operations in determination block 506 may be similar to the operations described above with reference to determination block 306, except that the processor may compare the current operations, location, and other characteristics of the mobile device to the stored sensor conditions to determine whether there are any matches. If the processor determines that no sensor condition is met (i.e., determination block 506="No"), the processor may continue to evaluate current conditions (e.g., time, location, operating parameters, etc.) in the operations of determination block 506 until a sensor condition is met.

In an optional embodiment, if the processor determines that no sensor condition is met (i.e., determination block 506="No"), the processor may perform the operations in the method 200, the method 250, or the method 300 described below with reference to FIG. 2A, FIG. 2B, or FIG. 3, respectively. In other words, the processor may perform operations to use a wireless transceiver to scan for available wireless network access points having unique identifiers associated with the stored list of identifiers.

If the processor determines that a sensor condition is met (i.e., determination block 506="Yes"), in block 216 the processor may activate a sensor (or sensors), such as a microphone and/or camera. In block 218, the processor may obtain sensor data via the activated sensor (or sensors), such as by receiving acoustic signals emitted by a speaker system via a microphone, and may process the obtained sensor data to identify encoded information in block 220. In determination block 402, the processor may determine whether the encoded information matches data in the stored list. If the processor determines that the encoded information does not match data in the stored list (i.e., determination block 402="No"), the processor may wait a period in optional block 213, such as by busy-waiting a predefined number of milliseconds, and then may continue to obtain sensor data in the operations in block 218. If the processor determines that the encoded information does match data in the stored list (i.e., determination block 402="Yes"), in optional block 204, the processor may activate a wireless transceiver, such as a WiFi or Bluetooth radio. In optional determination block 404, the processor may determine whether it can connect to a wireless network access point based on the encoded information. If the processor cannot connect to the wireless network access point based on the encoded information (i.e., optional determination block 404="No"), in optional block 254 the processor may de-activate the wireless transceiver, wait a period in optional block 213, and may continue to obtain sensor data with the operations in block 218. However, if the processor can connect to the wireless network access point based on the encoded information (i.e., optional determination block 404="Yes"), the processor may perform an action based on the encoded information in block 226, such as transmit a join message request to a group communications server indicated in the encoded information.

Figure 6:
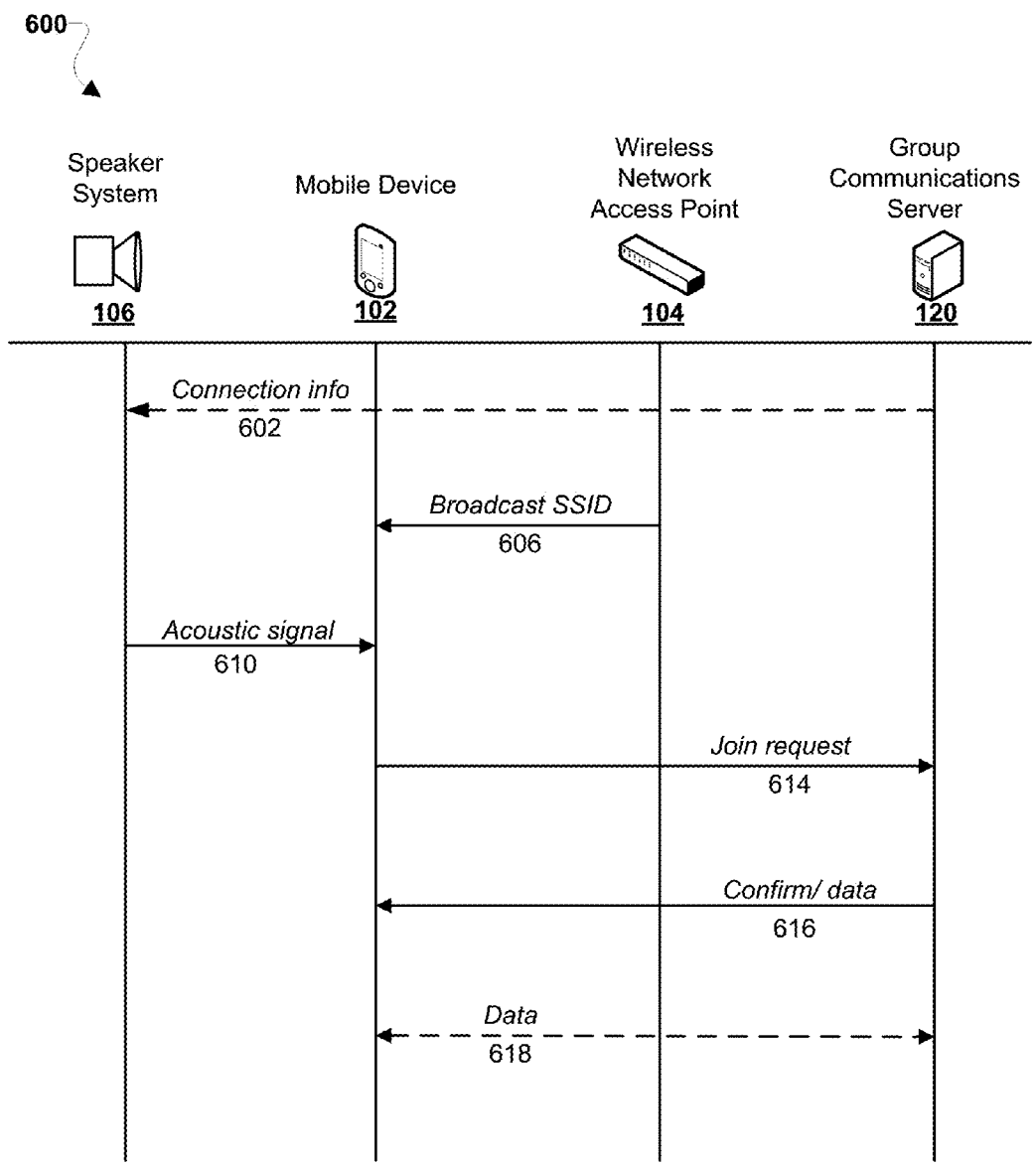
FIG. 6 is a call flow diagram illustrating embodiment communications for a mobile device joining a group communication in response to obtaining a unique identifier from a wireless network access point.

FIG. 6 illustrates an embodiment call flow 600 of communications for a mobile device 102 joining a group communication in response to obtaining a unique identifier from a wireless network access point 104. For example, as described above with reference to FIGS. 2A-3 and below with reference to FIG. 7, the mobile device 102 may receive data via a wireless transceiver that may trigger the activation and use of the sensors (e.g., a microphone) that were previously de-activated to conserve power.

In various embodiments, a speaker system 106, such as a PA system, may be configured to receive connection information in an optional message 602 from a group communications server 120. For example, via a wired or wireless connection to the Internet, the speaker system 106 may periodically download group session identifiers, times, member lists, SSIDs of related wireless network access points, encryption keys, and/or any other information for encoding into acoustic signals. Instead of receiving the optional message 602 from the group communications server 120, the speaker system 106 may alternatively obtain the connection information via user input and/or a local data source, such as via a USB key, CD ROM, DVD, or a local area network device.

The wireless network access point 104, such as a wireless router in a local area network associated with an area (e.g., a conference room within a convention center), may periodically broadcast its SSID via a broadcast message 606. The broadcast message 606 may be received by a mobile device 102, such as a smartphone carried by a convention attendee. The mobile device 102 may receive the broadcast message 606 when configured to scan for broadcast SSIDs using a wireless transceiver as described above with reference to the operations in block 206. In response to receiving the broadcast message 606, the mobile device 102 may activate a microphone, such as described above with reference to the operations in block 216.

The speaker system 106 may be configured to generate acoustic signals 610 that include encoded information including connection information (e.g., a group communication server 120 IP address, etc.), such as received from the optional message 602. For example, the acoustic signals 610 may be music played via a PA speaker that has an SSID encoded via modulation operations. The mobile device 102 may receive the acoustic signals 610 using its activated microphone, such as described above with reference to the operations in block 218. The mobile device 102 may process the received acoustic signals 610, as described above with reference to the operations in block 220, and in response to the processing, may transmit a join request message 614 to the group communications server 120. The join request message 614 may be transferred via Internet protocols, and in an optional embodiment, may be transferred through the wireless network access point 104. For example, the join request message 614 may be relayed over the Internet via the wireless network access point 104 after the mobile device 102 connects to the wireless network access point 104.

In response to receiving the join request message 614, the group communications server 120 may transmit a confirmation message 616 that may or may not include additional data, such as application data, or voice call information. For example, the confirmation message 616 may include an acknowledgement that the mobile device 102 has been admitted to a group communication as well as providing data describing the other participants of the group communication (e.g., usernames, pictures, etc.). In response to receiving the confirmation message 616, the mobile device 102 and the group communications server 120 may exchange various data messages 618, such as voice, video, and other data related to the group communication.

Figure 7:
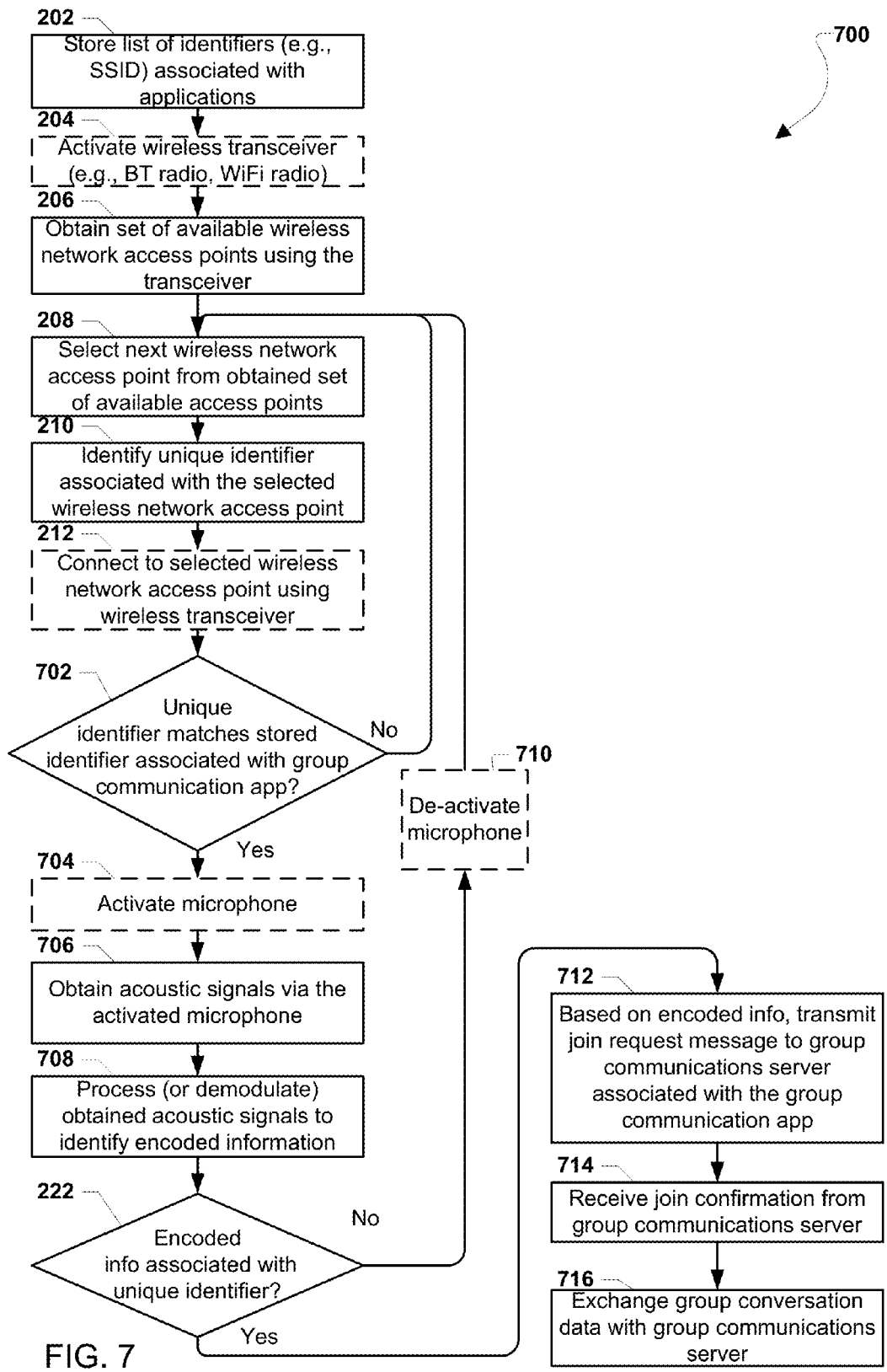
FIG. 7 is a process flow diagram illustrating an embodiment method for a mobile device joining a group communication in response to obtaining a unique identifier from a wireless signals from a wireless network access point.

FIG. 7 illustrates an embodiment method 700 for a mobile device joining a group communication in response to obtaining a unique identifier from a wireless signals from a wireless network access point. The method 700 is similar to the method 200 described above, except that in method 700 the mobile device processor may perform operations for explicitly processing acoustic signals received via a microphone to confirm proximity to an area related to a group communication, as well as performing operations to join the group communication. For example, when connected to a WiFi router within a certain conference room, a smartphone mobile device may also receive music broadcast from a PA speaker that have encoded information confirming the mobile device is within a meeting room associated with a conferencing application on the mobile device. Based on the confirmation that the smartphone mobile device is within the predefined area (e.g., a conference room within a convention center), the smartphone mobile device may utilize contact information within the music to transmit messages to a server for joining the meeting already in progress.

In block 202, the mobile device processor may store a list of identifiers (e.g., SSIDs) associated with applications of the mobile device, and in optional block 204, the processor may activate a wireless transceiver, such as a Bluetooth or WiFi radio. In block 206, the processor may obtain a set of available wireless network access points using the transceiver, such as by performing scanning operations using a WiFi radio. In block 208, the processor may select a next wireless network access point from the obtained set of available wireless network access points and may identify a unique identifier associated with the selected wireless network access point in block 210. In optional block 212, the processor may connect to the selected wireless network access point using the wireless transceiver.

In determination block 702, the processor may determine whether the identified unique identifier matches an identifier in the stored list that is associated with a group communication application. In other words, the processor may compare the identified unique identifier to the identifiers in the stored list to determine whether the unique identifier of the selected wireless network access point (e.g., SSID) is both represented in the stored list and corresponds to an application configured to enable group communications. For example, the processor may compare the SSID of the selected wireless network access point to a list of predefined SSIDs that relate to QChat meetings for which the user of the mobile device has registered. If the unique identifier is determined to not match a stored identifier that is associated with the group communication application (i.e., determination block 702="No"), the processor may continue with the operations in block 208 by selecting the next available wireless network access point in the obtained set.

However, if the unique identifier is determined to match a stored identifier that is associated with the group communication application (i.e., determination block 702="Yes"), in optional block 704, if not already activated, the processor may activate a microphone and obtain acoustic signals via the activated microphone in block 706. For example, the microphone may receive music, audio samples, inaudible sounds, and other acoustic signals that are emitted by a speaker, such as a speaker within a PA system, another mobile device (e.g., a tablet mobile device within a conference room), or connected to a desktop. In block 708, the processor may process (or demodulate) the obtained acoustic signals to identify encoded information, such as SSIDs and group communication contact information. In determination block 222, the processor may determine whether the encoded information is associated with the unique identifier. If the processor determines that the encoded information is not associated with the unique identifier (i.e., determination block 222="No"), the processor may de-activate the microphone in optional block 710 and may continue to select a next wireless network access point from the obtained set in the operations in block 208.

However, if the processor determines that the encoded information is associated with the unique identifier (i.e., determination block 222="Yes"), based on the encoded information, in block 712 the processor may transmit a join request message to a group communications server associated with the group communication application. For example, the processor may transmit a message that requests to join an ongoing QChat session, a PTT conversation, or a video conference that is scheduled to start. In an embodiment, the join request message may be transmitted via Internet protocols, SMS (or MMS) text message, email, short-range wireless signals (e.g., Bluetooth, etc.), and/or via a proprietary message format associated with the group communication application and/or the group communications server. Further, the join request message may include various data required to verify or authorize the mobile device (and its user) to the group communications server. For example, the join request message may include credentials, such as passwords, user IDs, phone numbers, payment/billing status of a service (e.g., a receipt confirmation for payment of a chat organization, convention admission receipt, etc.), MAC addresses, secret keys, and/or login identities, and further may be encrypted or obscured. In various embodiments, the join request message may include credentials identified within the encoded information from the acoustic signals, or alternatively, credentials stored within the mobile device. For example, the encoded information may indicate that any join message must include a time-sensitive token that is included within the received acoustic signals. As another example, the join request message may include information that the mobile device encrypts using a predetermined algorithm and a key identified within the received acoustics signals.

In block 714, the processor may receive a join confirmation from the group communications server, and in block 716 the processor may continue to exchange group conversation data with the group communications server, such as by uploading/ downloading data, streaming video feeds, etc. In an embodiment, the exchanged data may include locally relevant data or information, such as brochures, pamphlets, or instructional information related to the area the mobile device is current located. For example, the mobile device may receive audio data for a tour or supplementary text related to exhibitions while located within a museum.

Figure 8:
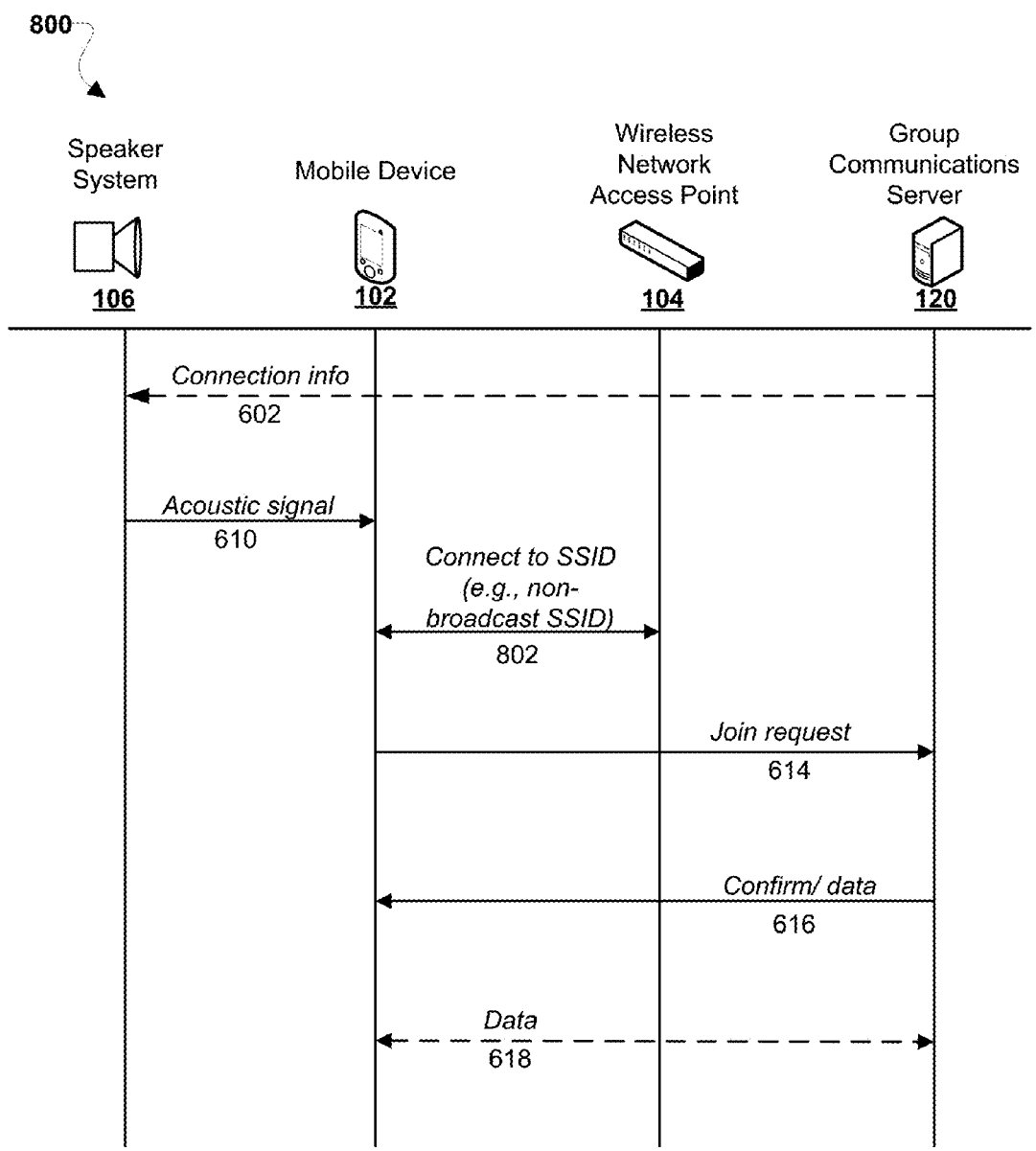
FIG. 8 is a call flow diagram illustrating embodiment communications for a mobile device joining a group communication in response to obtaining a unique identifier from a speaker system.

FIG. 8 illustrates an embodiment call flow 800 of communications for a mobile device 102 joining a group communication in response to obtaining a unique identifier from a speaker system 106. The call flow 800 may be similar to the call flow 600 described above, except the call flow 800 may include the mobile device 102 receiving acoustic signals 610 from the speaker system 106 using an activated microphone prior to exchanging communications with a wireless network access point 104. For example, as described above with reference to FIGS. 4-5 and below with reference to FIG. 9, the mobile device 102 may receive data via sensors (e.g., a microphone) that may trigger the activation and use of the wireless transceiver that may have been previously deactivated to conserve power. The technique of first utilizing sensors prior to activated wireless transceivers may also be useful when the wireless network access point is not configured to broadcast its identification information (e.g., SSIDs), as acoustic signals may be processed to identify such identification information (e.g., non-broadcast SSIDs).

As described above, the speaker system 106, such as a PA system, may be configured to receive connection information in an optional message 602 from a group communications server 120. For example, via a wired or wireless connection to the Internet, the speaker system 106 may periodically download group session identifiers, times, member lists, SSIDs of related wireless network access points, encryption keys, and/or any other information for encoding into acoustic signals. Alternatively, the speaker system 106 may obtain such information from local data sources as described above.

The speaker system 106 may be configured to generate acoustic signals 610 that include encoded information including connection information (e.g., a group communication server 120 IP address, etc.), such as received from the optional message 602. For example, the acoustic signals 610 may be music played via a PA speaker that has an SSID encoded via modulation operations. The mobile device 102 may receive the acoustic signals 610 using its activated microphone, such as described above with reference to the operations in block 218. The mobile device 102 may process the received acoustic signals 610, as described above with reference to the operations in block 220. In an embodiment, the encoded information from the acoustic signals 610 may include a non-broadcast SSID of the wireless network access point 104.

In response to processing the received acoustic signals 610, the mobile device 102 may activate a wireless transceiver (e.g., a WiFi radio), such as described above with reference to the operations in block 204, and may exchange communications 802 with the wireless network access point 104. For example, the mobile device 102 may connect with the wireless network access point 104 using a non-broadcast SSID from the processed acoustic signals 610. In various embodiments, the communications 802 between the mobile device 102 and wireless network access point 104 may include sharing credentials and other data to enable the mobile device 102 to access a wireless local area network associated with the wireless network access point 104.

In response to connecting with the wireless network access point via the communications 802, the mobile device 102 may transmit a join request message 614 to the group communications server 120. The join request message 614 may be transferred via Internet protocols, and in an optional embodiment, may be transferred through the wireless network access point 104. For example, the join request message 614 may be relayed over the Internet via the wireless network access point 104 after the mobile device 102 connects to the wireless network access point 104.

In response to receiving the join request message 614, the group communications server may transmit a confirmation message 616 that may or may not include additional data, such as application data, or voice call information. For example, the confirmation message 616 may include an acknowledgement that the mobile device 102 has been admitted to a group communication as well as providing data describing the other participants of the group communication (e.g., usernames, pictures, etc.). In response to receiving the confirmation message 616, the mobile device 102 and the group communications server 120 may exchange various data messages 618, such as voice, video, and other data related to the group communication.

Figure 9:
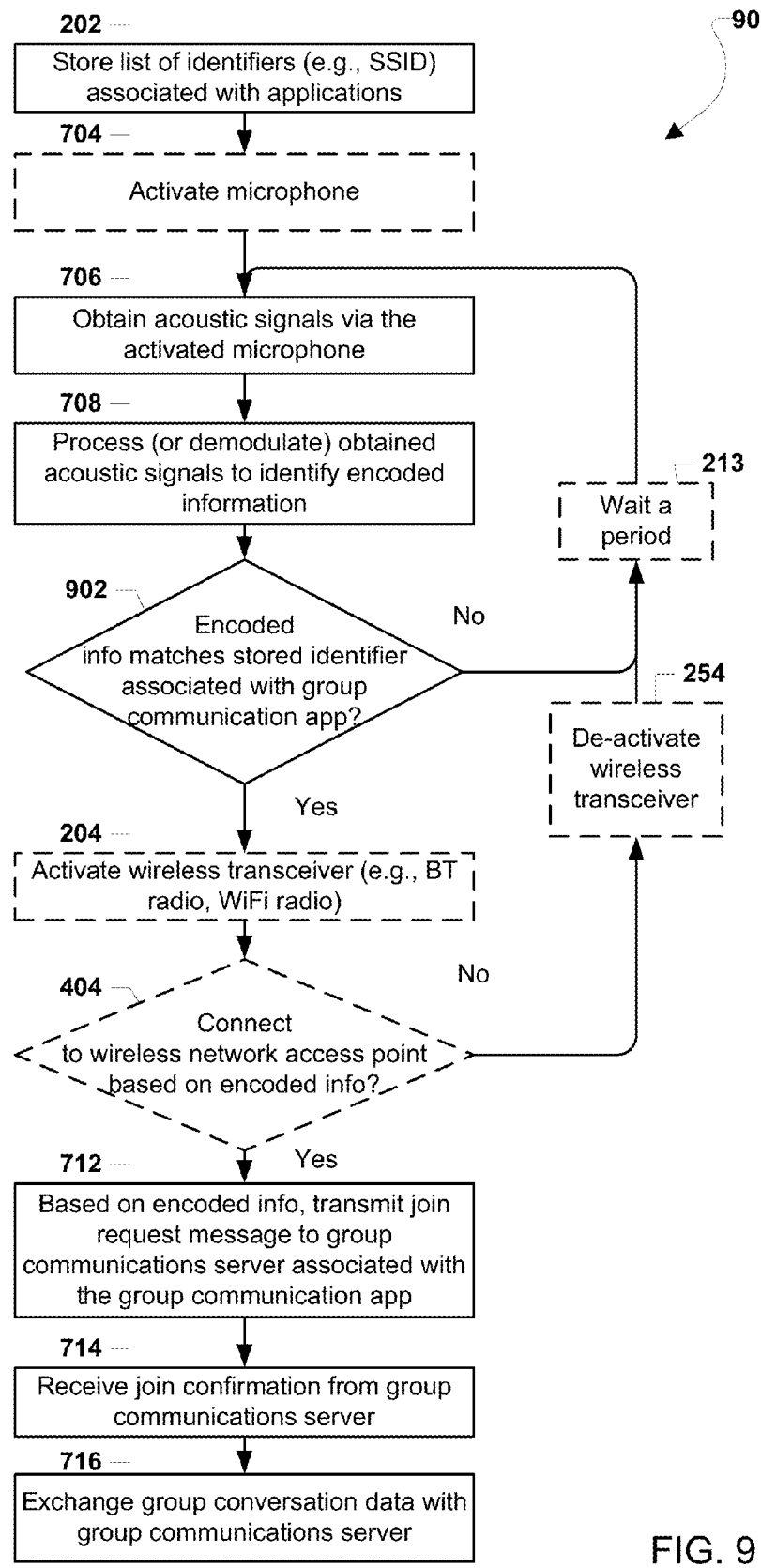
FIG. 9 is a process flow diagram illustrating an embodiment method for a mobile device joining a group communication in response to obtaining a unique identifier from acoustic signals.

FIG. 9 illustrates an embodiment method 900 for a mobile device joining a group communication in response to obtaining a unique identifier from acoustic signals. The method 900 is similar to the method 400 described above, except that in method 900 the mobile device processor may perform operations for processing acoustic signals received via a microphone to confirm proximity to an area related to a group communication, as well as performing operations to join the group communication.

In block 202, the mobile device processor may store a list of identifiers (e.g., SSIDs) associated with applications of the mobile device, and in optional block 204, the processor may activate a wireless transceiver, such as a Bluetooth or WiFi radio. In optional block 704, the processor may activate a microphone and in block 706 may obtain acoustic signals via the activated microphone. For example, the processor may begin recording and storing (or buffering) sounds, noises, music, and other ambient content. In block 708, the processor may process or demodulate the obtained acoustic signals to identify encoded information, such as SSIDs or contact information for a group communications server.

In determination block 902, the processor may determine whether the encoded information identified from the processed acoustic signals matches an identifier in the stored list that is associated with a group communication application. In other words, the processor may compare an identifier (e.g., an SSID) identified within the encoded information to the identifiers in the stored list to determine whether the identifier in the encoded information is both represented in the stored list and corresponds to an application configured to enable group communications. For example, the processor may compare an SSID detected within the encoded information of the received acoustic signals to a list of predefined SSIDs that relate to QChat meetings for which the user of the mobile device has registered. If the encoded information is determined to not match a stored identifier that is associated with the group communication application (i.e., determination block 902="No"), the processor may wait a period in optional block 213 and continue obtaining acoustic signals with the operations in block 706.

However, if the encoded information is determined to match a stored identifier that is associated with the group communication application (i.e., determination block 902="Yes"), in optional block 204, if not already activated, the processor may activate a wireless transceiver (e.g., a WiFi radio). In optional determination block 404, the processor may determine whether it can connect to a wireless network access point based on the encoded information. For example, using the wireless transceiver, the processor may perform operations to connect to an SSID indicated in the encoded information or alternatively may scan for available wireless network access points with SSIDs that match the encoded information. If the processor determines that the mobile device cannot connect to the wireless network access point based on the encoded information (i.e., optional determination block 404="No"), the processor may de-activate the wireless transceiver in optional block 254, wait a period in optional block 213, continue to obtain acoustic signals via the activated microphone in block 706. However, if the processor determines that the mobile device can connect to the wireless network access point based on the encoded information (i.e., optional determination block 404="Yes"), based on the encoded information, in block 712 the processor may transmit a join request message to a group communications server associated with the group communication application. In block 714, the processor may receive a join confirmation from the group communications server, and in block 716 the processor may continue to exchange group conversation data with the group communications server, such as by uploading/downloading data, streaming video feeds, etc.

Figure 10:
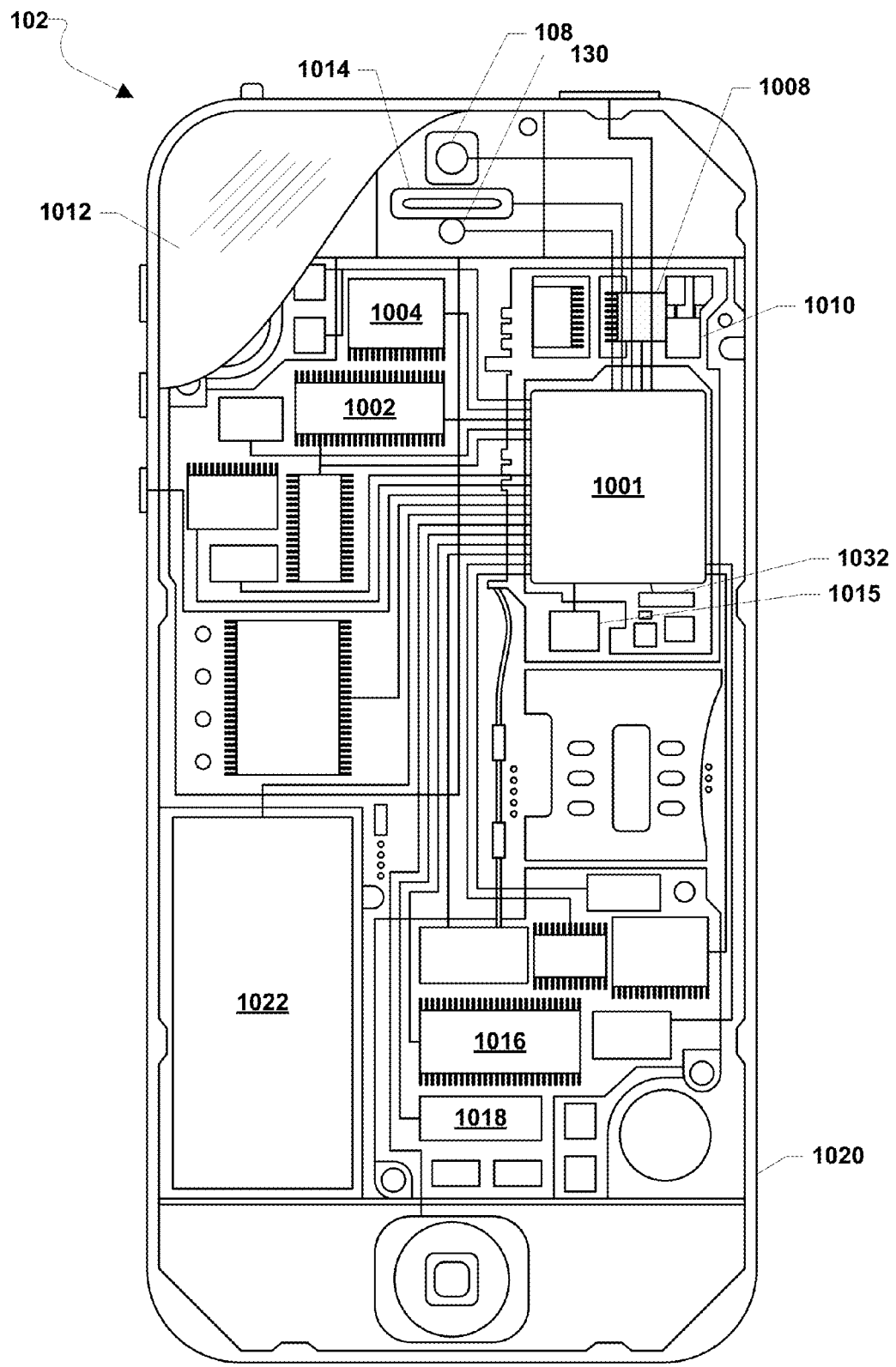
FIG. 10 is a component block diagram of a mobile device suitable for use in various embodiments.

FIG. 10 illustrates an embodiment mobile device 102 suitable for use in various embodiments. In various embodiments, the mobile device 102 may include a processor 1001 coupled to a touchscreen controller 1004 and an internal memory 1002. The processor 1001 may be one or more multicore ICs designated for general or specific processing tasks. The internal memory 1002 may be volatile or non-volatile memory, and may also be secure and/or encrypted memory, or unsecure and/or unencrypted memory, or any combination thereof. The touchscreen controller 1004 and the processor 1001 may also be coupled to a touchscreen panel 1012, such as a resistive-sensing touchscreen, capacitive-sensing touchscreen, infrared sensing touchscreen, etc. The mobile device 102 may have one or more radio signal transceivers 1008 (e.g., Peanut®, Bluetooth®, Zigbee®, Wi-Fi, RF radio) and antennae 1010, for sending and receiving, coupled to each other and/or to the processor 1001. The transceivers 1008 and antennae 1010 may be used with the above-mentioned circuitry to implement the various wireless transmission protocol stacks and interfaces. The mobile device 102 may include a cellular network wireless modem chip 1016 that enables communication via a cellular network and is coupled to the processor. The mobile device 102 may include a peripheral device connection interface 1018 coupled to the processor 1001. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The mobile device 102 may also include speakers 1014 for providing audio outputs. The mobile device 102 may also include a housing 1020, constructed of a plastic, metal, or a combination of materials, for containing all or some of the components discussed herein. The mobile device 102 may include a power source 1022 coupled to the processor 1001, such as a disposable or rechargeable battery. The rechargeable battery may also be coupled to the peripheral device connection port to receive a charging current from a source external to the mobile device 102. Additionally, the mobile device 102 may include a GPS receiver chip 1015 coupled to the processor 801 as well as various sensors coupled to the processor 801, such as a microphone 108, a camera 130, and an accelerometer 1032.

Figure 11:
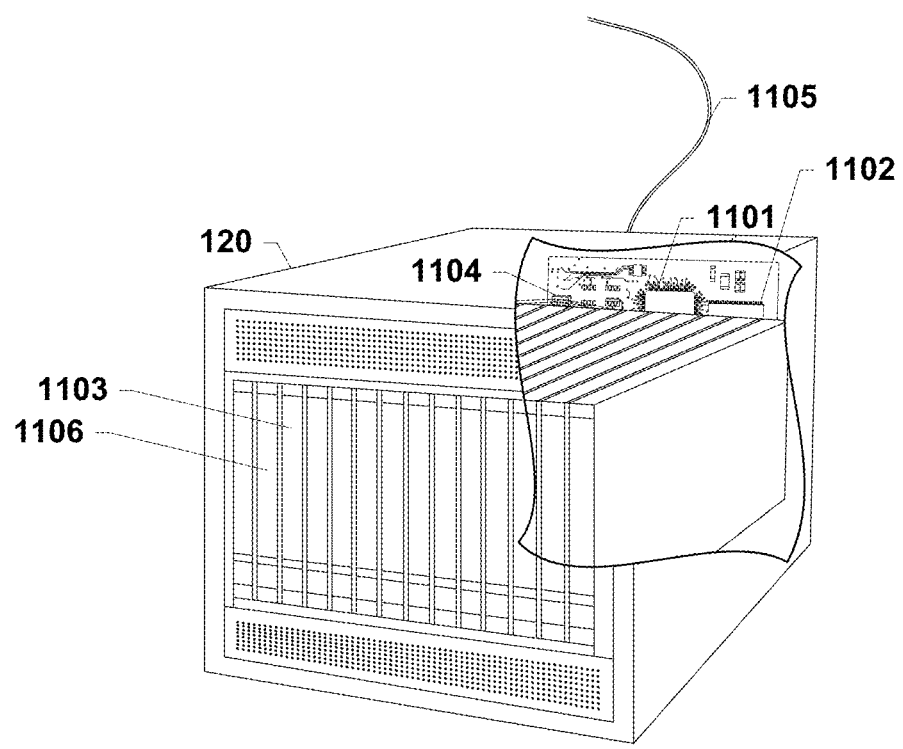
FIG. 11 is a component block diagram of a server computing device suitable for use in an embodiment.

The various embodiments may be implemented on any of a variety of commercially available server devices, such as the server computing device 120 illustrated in FIG. 11. Such a server computing device 120 typically includes a processor 1101 coupled to volatile memory 1102 and a large capacity nonvolatile memory, such as a disk drive 1103. The server computing device 120 may also include a floppy disc drive, compact disc (CD) or DVD disc drive 1106 coupled to the processor 1101. The server computing device 120 may also include network access ports 1104 (or network interfaces) coupled to the processor 1101 for establishing data connections with a network 1105, such as a local area network coupled to other broadcast system computers and servers.

The processors 136, 1001, and 1101 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 137, 1002, and 1102 before they are accessed and loaded into the processors 136, 1001, and 1101. The processors 136, 1001, and 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 136, 1001, and 1101 including internal memory or removable memory plugged into the various devices and memory within the processors 136, 1001, and 1101.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or server-readable medium or a non-transitory processor-readable storage medium. The steps of a method or algorithm disclosed herein may be embodied in a processor-executable software module which may reside on a tangible, non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a mobile device to perform actions associated with applications when confirmed to be within proximity of a physical location relevant to the applications, comprising:

identifying, via a processor of the mobile device, a unique identifier of a proximate wireless network access point;

determining, via the processor, whether the unique identifier matches a predefined identifier stored on the mobile device and associated with an application;
obtaining sensor data via a sensor of a plurality of sensors within the mobile device in response to determining that the unique identifier matches the predefined identifier stored on the mobile device and associated with the application, wherein the unique identifier indicates a type of sensor data associated with the sensor of the plurality of sensors;
processing, via the processor, the obtained sensor data to identify encoded information;
determining, via the processor, whether the encoded information within the obtained sensor data is associated with the unique identifier; and
performing, via the processor, an action based on the encoded information in response to determining that the encoded information is associated with the unique identifier,
wherein performing, via the processor, an action based on the encoded information in response to determining that the encoded information is associated with the unique identifier comprises transmitting, via the processor, a join request message to a group communications server associated with the application based on the encoded information in response to determining that the encoded information is associated with the unique identifier.

2. The method of claim 1, wherein the unique identifier is one of a service set identifier (SSID) of the wireless network access point, a machine (MAC) address of the wireless network access point, and a special string indicating that the sensor data is available.

3. The method of claim 1, wherein the sensor data is one of acoustic signals received by a microphone, light signals received by a camera, a quick response (QR) code scanned by the camera, and vibrations received by an accelerometer.

4. The method of claim 3, wherein the acoustic signals are at least one of music, an inaudible sound, a tone, and a beep, and the acoustic signals are emitted from a speaker system.

5. The method of claim 1, wherein the encoded information includes at least one of a group communication identifier, an access code, login information, a time-to-live (TTL) value, a decryption key, a vocoder, a geofence information, billing information, authentication information, a non-broadcast SSID, and a URL/URI of the group communications server for a group communication session.

6. The method of claim 1, wherein identifying, via a processor of the mobile device, a unique identifier of a proximate wireless network access point comprises:
determining, via the processor, whether a predefined condition is met, wherein the predefined condition corresponds to one of an operating state of the mobile device, a time, and a location; and
identifying, via the processor, the unique identifier of the wireless network access point on the proximate wireless network in response to determining that the predefined condition is met.

7. The method of claim 1, further comprising:
determining, via the processor, whether the unique identifier of the proximate wireless network access point is being broadcast based on scanning operations with a wireless transceiver;
obtaining the sensor data via the sensor of the plurality of sensors in response to determining that the unique identifier of the proximate wireless network access point is not being broadcast based on the scanning operations with the wireless transceiver;
processing, via the processor, the obtained sensor data to identify the encoded information, wherein the encoded information includes at least a non-broadcast SSID of the proximate wireless network access point;
determining, via the processor, whether the encoded information matches the predefined identifier stored on the mobile device and associated with the application;
determining, via the processor, whether the mobile device can connect to the proximate wireless network access point based on the encoded information in response to determining that the encoded information matches the predefined identifier; and
performing, via the processor, the action based on the encoded information in response to determining that the mobile device can connect to the proximate wireless network access point.

8. A mobile device, comprising:
means for identifying a unique identifier of a proximate wireless network access point;
means for determining whether the unique identifier matches a predefined identifier stored on the mobile device and associated with an application;
means for obtaining sensor data in response to determining that the unique identifier matches the predefined identifier stored on the mobile device and associated with the application, wherein the unique identifier indicates a type of sensor data associated with the means for obtaining sensor data;
means for processing the obtained sensor data to identify encoded information;
means for determining whether the encoded information within the obtained sensor data is associated with the unique identifier; and
means for performing an action based on the encoded information in response to determining that the encoded information is associated with the unique identifier,
wherein means for performing an action based on the encoded information in response to determining that the encoded information is associated with the unique identifier comprises means for transmitting a join request message to a group communications server associated with the application based on the encoded information in response to determining that the encoded information is associated with the unique identifier.

9. The mobile device of claim 8, wherein the unique identifier is one of a service set identifier (SSID) of the wireless network access point, a machine (MAC) address of the wireless network access point, and a special string indicating that the sensor data is available.

10. The mobile device of claim 8, wherein means for obtaining sensor data is one of:
means for obtaining acoustic signals including at least one of music, an inaudible sound, a tone, and a beep;
means for receiving light signals;
means for scanning a quick response (QR) code; and
means for measuring vibrations.

11. The mobile device of claim 8, wherein the encoded information includes at least one of a group communication identifier, an access code, login information, a time-to-live (TTL) value, a decryption key, a vocoder, a geofence information, billing information, authentication information, a non-broadcast SSID, and a URL/URI of the group communications server for a group communication session.

12. The mobile device of claim 8, wherein means for identifying a unique identifier of a proximate wireless network access point comprises:

means for determining whether a predefined condition is met, wherein the predefined condition corresponds to one of an operating state of the mobile device, a time, and a location; and means for identifying the unique identifier of the wireless network access point on the proximate wireless network in response to determining that the predefined condition is met.

13. The mobile device of claim 8, further comprising:

means for determining whether the unique identifier of the proximate wireless network access point is being broadcast based on scanning operations;

means for obtaining the sensor data in response to determining that the unique identifier of the proximate wireless network access point is not being broadcast based on the scanning operations;

means for processing the obtained sensor data to identify the encoded information, wherein the encoded information includes at least a non-broadcast SSID of the proximate wireless network access point;

means for determining whether the encoded information matches the predefined identifier stored on the mobile device and associated with the application;

means for determining whether the mobile device can connect to the proximate wireless network access point based on the encoded information in response to determining that the encoded information matches the predefined identifier; and means for performing the action based on the encoded information in response to determining that the mobile device can connect to the proximate wireless network access point.

14. A mobile device, comprising:

a memory;

a plurality of sensors; and a processor coupled to the memory and the plurality of sensors, wherein the processor is configured with processor-executable instructions to perform operations comprising:

identifying a unique identifier of a proximate wireless network access point;

determining whether the unique identifier matches a predefined identifier stored in the memory and associated with an application;

obtaining sensor data via a sensor of the plurality of sensors in response to determining that the unique identifier matches the predefined identifier stored in the memory and associated with the application, wherein the unique identifier indicates a type of sensor data associated with the sensor of the plurality of sensors;

processing the obtained sensor data to identify encoded information;

determining whether the encoded information within the obtained sensor data is associated with the unique identifier; and performing an action based on the encoded information in response to determining that the encoded information is associated with the unique identifier, wherein the processor is configured with processor-executable instructions such that performing an action based on the encoded information in response to determining that the encoded information is associated with the unique identifier comprises transmitting a join request message to a group communications server associated with the application based on the encoded information in response to determining that the encoded information is associated with the unique identifier.

15. The mobile device of claim 14, wherein the unique identifier is one of a service set identifier (SSID) of the wireless network access point, a machine (MAC) address of the wireless network access point, and a special string indicating that the sensor data is available.

16. The mobile device of claim 14, wherein:

the sensor of the plurality of sensors is one of a microphone, a camera, and an accelerometer; and the sensor data is one of:

acoustic signals received by the microphone wherein the acoustic signals are at least one of music, an inaudible sound, a tone, and a beep, and the acoustic signals are emitted from a speaker system;

light signals received by the camera;

a quick response (QR) code scanned by the camera; and vibrations received by the accelerometer.

17. The mobile device of claim 14, wherein the encoded information includes at least one of a group communication identifier, an access code, login information, a time-to-live (TTL) value, a decryption key, a vocoder, a geofence information, billing information, authentication information, a non-broadcast SSID, and a URL/URI of the group communications server for a group communication session.

18. The mobile device of claim 14, wherein the processor is configured with processor-executable instructions such that identifying a unique identifier of a proximate wireless network access point comprises:

determining whether a predefined condition is met, wherein the predefined condition corresponds to one of an operating state of the mobile device, a time, and a location; and identifying the unique identifier of the wireless network access point on the proximate wireless network in response to determining that the predefined condition is met.

19. The mobile device of claim 14, wherein the processor is configured with processor-executable instructions further comprising:

determining whether the unique identifier of the proximate wireless network access point is being broadcast based on scanning operations with a wireless transceiver;

obtaining the sensor data via the sensor of the plurality of sensors in response to determining that the unique identifier of the proximate wireless network access point is not being broadcast based on the scanning operations with the wireless transceiver;

processing the obtained sensor data to identify the encoded information, wherein the encoded information includes at least a non-broadcast SSID of the proximate wireless network access point;

determining whether the encoded information matches the predefined identifier stored on the mobile device and associated with the application;

determining whether the mobile device can connect to the proximate wireless network access point based on the encoded information in response to determining that the encoded information matches the predefined identifier; and performing the action based on the encoded information in response to determining that the mobile device can connect to the proximate wireless network access point.

20. A non-transitory processor-readable storage medium having stored thereon processor-executable software instructions configured to cause a processor of a mobile device to perform operations comprising:

identifying a unique identifier of a proximate wireless network access point;

determining whether the unique identifier matches a predefined identifier stored on the mobile device and associated with an application;

obtaining sensor data via a sensor of a plurality of sensors within the mobile device in response to determining that the unique identifier matches the predefined identifier stored on the mobile device and associated with the application, wherein the unique identifier indicates a type of sensor data associated with the sensor of the plurality of sensors;

processing the obtained sensor data to identify encoded information;

determining whether the encoded information within the obtained sensor data is associated with the unique identifier; and performing an action based on the encoded information in response to determining that the encoded information is associated with the unique identifier, wherein the stored processor-executable software instructions are configured to cause the processor of the mobile device to perform operations such that performing an action based on the encoded information in response to determining that the encoded information is associated with the unique identifier comprises transmitting a join request message to a group communications server associated with the application based on the encoded information in response to determining that the encoded information is associated with the unique identifier.

21. The non-transitory processor-readable storage medium of claim 20, wherein the stored processor-executable software instructions are configured to cause the processor of the mobile device to perform operations such that the unique identifier is one of a service set identifier (SSID) of the wireless network access point, a machine (MAC) address of the wireless network access point, and a special string indicating that the sensor data is available.

22. The non-transitory processor-readable storage medium of claim 20, wherein the stored processor-executable software instructions are configured to cause the processor of the mobile device to perform operations such that the sensor data is one of acoustic signals received by a microphone, light signals received by a camera, a quick response (QR) code scanned by the camera, and vibrations received by an accelerometer.

23. The non-transitory processor-readable storage medium of claim 22, wherein the stored processor-executable software instructions are configured to cause the processor of the mobile device to perform operations such that the acoustic signals are at least one of music, an inaudible sound, a tone, and a beep, and the acoustic signals are emitted from a speaker system.

24. The non-transitory processor-readable storage medium of claim 20, wherein the stored processor-executable software instructions are configured to cause the processor of the mobile device to perform operations such that the encoded information includes at least one of a group communication identifier, an access code, login information, a time-to-live (TTL) value, a decryption key, a vocoder, a geofence information, billing information, authentication information, a non-broadcast SSID, and a URL/URI of the group communications server for a group communication session.

25. The non-transitory processor-readable storage medium of claim 20, wherein the stored processor-executable software instructions are configured to cause the processor of the mobile device to perform operations such that identifying a unique identifier of a proximate wireless network access point comprises:

determining whether a predefined condition is met, wherein the predefined condition corresponds to one of an operating state of the mobile device, a time, and a location; and identifying the unique identifier of the wireless network access point on the proximate wireless network in response to determining that the predefined condition is met.

26. The non-transitory processor-readable storage medium of claim 20, wherein the stored processor-executable software instructions are configured to cause the processor of the mobile device to perform operations further comprising:

determining whether the unique identifier of the proximate wireless network access point is being broadcast based on scanning operations with a wireless transceiver;

obtaining the sensor data via the sensor of the plurality of sensors in response to determining that the unique identifier of the proximate wireless network access point is not being broadcast based on the scanning operations with the wireless transceiver;

processing the obtained sensor data to identify the encoded information, wherein the encoded information includes at least a non-broadcast SSID of the proximate wireless network access point;

determining whether the encoded information matches the predefined identifier stored on the mobile device and associated with the application;

determining whether the mobile device can connect to the proximate wireless network access point based on the encoded information in response to determining that the encoded information matches the predefined identifier; and performing the action based on the encoded information in response to determining that the mobile device can connect to the proximate wireless network access point.

27. The method of claim 1, further comprising:

performing, via the processor, a second action based on the encoded information in response to determining that the encoded information is associated with the unique identifier, wherein the second action is one or more of launching the application, executing a script, and rendering a message to a user.

28. The mobile device of claim 8, further comprising:

means for performing a second action based on the encoded information in response to determining that the encoded information is associated with the unique identifier, wherein the second action is one or more of launching the application, executing a script, and rendering a message to a user.

29. The mobile device of claim 14, wherein the processor is configured with processor-executable instructions further comprising:

performing a second action based on the encoded information in response to determining that the encoded information is associated with the unique identifier, wherein the second action is one or more of launching the application, executing a script, and rendering a message to a user.

30. The non-transitory processor-readable storage medium of claim 20, wherein the stored processor-executable software instructions are configured to cause the processor of the mobile device to perform operations further comprising:

performing a second action based on the encoded information in response to determining that the encoded information is associated with the unique identifier, wherein the second action is one or more of launching the application, executing a script, and rendering a message to a user.

* * * * *